US009718955B2

(12) United States Patent
Arakawa et al.

(10) Patent No.: US 9,718,955 B2
(45) Date of Patent: *Aug. 1, 2017

(54) INJECTION-MOLDED BODY

(75) Inventors: Shota Arakawa, Kanagawa (JP); Takafumi Oda, Kanagawa (JP); Ryoji Otaki, Kanagawa (JP); Kentaro Ishii, Kanagawa (JP)

(73) Assignee: MITSUBISHI GAS CHEMICAL COMPANY, INC., Tokyo (JP)

(*) Notice: Subject to any disclaimer, the term of this patent is extended or adjusted under 35 U.S.C. 154(b) by 354 days.

This patent is subject to a terminal disclaimer.

(21) Appl. No.: 14/128,988

(22) PCT Filed: Jun. 19, 2012

(86) PCT No.: PCT/JP2012/065646
§ 371 (c)(1),
(2), (4) Date: Dec. 27, 2013

(87) PCT Pub. No.: WO2013/002072
PCT Pub. Date: Jan. 3, 2013

(65) Prior Publication Data
US 2014/0120289 A1   May 1, 2014

(30) Foreign Application Priority Data
Jun. 27, 2011   (JP) ................. 2011-142160

(51) Int. Cl.
| B32B 27/08 | (2006.01) |
| C08L 67/03 | (2006.01) |
| C08L 23/02 | (2006.01) |
| C08L 67/00 | (2006.01) |
| C08L 77/06 | (2006.01) |
| C08L 77/02 | (2006.01) |
| C08G 69/36 | (2006.01) |
| C08L 77/04 | (2006.01) |
| B32B 1/08 | (2006.01) |
| B29K 105/00 | (2006.01) |

(52) U.S. Cl.
CPC .............. *C08L 67/03* (2013.01); *C08G 69/36* (2013.01); *C08L 23/02* (2013.01); *C08L 67/00* (2013.01); *C08L 77/02* (2013.01); *C08L 77/04* (2013.01); *C08L 77/06* (2013.01); *B29K 2105/258* (2013.01); *C08L 2205/02* (2013.01); *Y10T 428/1397* (2015.01)

(58) Field of Classification Search
CPC ... B32B 27/08; Y10T 428/1397; C08L 67/03; C08L 23/02; B29K 2105/258
USPC ............................. 428/34.1, 34.2, 35.7, 36.92
See application file for complete search history.

(56) References Cited

U.S. PATENT DOCUMENTS

| 4,014,957 A * | 3/1977 | Kirsch ................... C08L 77/00 524/538 |
| 8,653,225 B2 * | 2/2014 | Oda ....................... C08G 69/36 528/328 |
| 8,835,595 B2 * | 9/2014 | Oda ....................... C08L 77/06 525/432 |
| 9,156,980 B2 * | 10/2015 | Bastioli ................. C08G 63/16 |
| 2009/0239013 A1 * | 9/2009 | Otaki ..................... B32B 27/08 428/36.6 |
| 2012/0302723 A1 | 11/2012 | Oda et al. |
| 2013/0303367 A1 | 11/2013 | Oda et al. |

FOREIGN PATENT DOCUMENTS

| JP | 62-106926 | 5/1987 |
| JP | 2-72851 | 3/1990 |
| JP | 4-90848 | 3/1992 |
| JP | 5-115776 | 5/1993 |
| JP | 8-319417 | 12/1996 |
| JP | 2991437 | 12/1999 |
| JP | 2003-341747 | 12/2003 |
| JP | 2005-112990 | 4/2005 |
| JP | 2007-297607 | 11/2007 |
| WO | WO 87/02680 A2 | 5/1987 |
| WO | WO 87/02680 A3 | 5/1987 |
| WO | WO 2010/147097 A1 | 12/2010 |

OTHER PUBLICATIONS

Arvanitoyannis, et al., "Novel copolyamides based on adipic acid, 1,6-hexanediamine and α-amino acids: 2. Study of properties and their biodegradability for food-packaging applications", Polymer, vol. 36, No. 15, 1995, pp. 2957-2967.
Arvanitoyannis, et al., "Novel biodegradable copolyamides based on adipic acid, 1,6 hexane diamine and aminoacids: synthesis and study of properties: Part 1", Studies in Polymer Science 12 (Biodegradable Plastics and Polymers), 1994, pp. 562-569.
International Search Report issued Sep. 18, 2012, in PCT/JP12/065646 filed Jun. 19, 2012.
U.S. Appl. No. 14/129,198, filed Dec. 24, 2013, Oda, et al.
Extended European Search Report issued Oct. 31, 2014 in Patent Application No. 12804263.7.

* cited by examiner

*Primary Examiner* — Marc A Patterson
(74) *Attorney, Agent, or Firm* — Oblon, McClelland, Maier & Neustadt, L.L.P.

(57) ABSTRACT

An injection molded article containing a resin composition containing a polyamide compound (A) and a resin (B), wherein the polyamide compound (A) contains from 25 to 50% by mol of a diamine unit, which contains a particular diamine unit, in an amount of 50% by mol or more; from 25 to 50% by mol of a dicarboxylic acid unit, which contains a particular dicarboxylic acid unit, in an amount of 50% by mol or more; and from 0.1 to 50% by mol of a particular constitutional unit.

13 Claims, No Drawings

INJECTION-MOLDED BODY

CROSS-REFERENCE TO RELATED APPLICATIONS

This application is a National Stage of PCT/JP2012/065646, which was filed on Jun. 19, 2012. This application is based upon and claims the benefit of priority to Japanese Application No. 2011-142160, which was filed on Jun. 27, 2011.

TECHNICAL FIELD

The present invention relates to an injection molded article that has an oxygen barrier capability and an oxygen absorbing capability, and a container obtained by processing the injection molded article.

BACKGROUND ART

Injection molding enables production of a molded article having a complicated shape with high productivity, and thus is widely spread for machine parts, automobile parts, electric and electronic parts, food and drug containers and the like. In recent years, various plastic containers have been used as packaging containers owing to the advantages thereof, such as light weight, transparency and good moldability. As a representative plastic container, for example, a container for beverages and the like, an injection molded article having a mouth with a screw shape enabling plugging with a cap has been frequently used.

Examples of the material used in the injection molded article include a polyolefin, such as polyethylene and polypropylene, and a versatile resin, such as polyester and polystyrene. In particular, an injection molded article using a plastic container (such as a bottle) mainly containing a polyester, such as polyethylene terephthalate (PET), has been widely used for beverages, such as tea, juice beverages and carbonated beverages. The injection molded article mainly containing a thermoplastic resin is excellent as a packaging material, but as being different from a glass bottle and a metal container, it has such a nature that oxygen penetrates from the outside thereof, and thus has a problem remaining in storage stability of the content charged and sealed therein. For imparting the gas barrier property to the injection molded article containing a versatile resin, an injection molded article obtained by melt-mixing a thermoplastic resin having high gas barrier property with a versatile resin, such as polyester, as a major component of the injection molded article, and a multilayer injection molded article having a gas barrier layer as an intermediate layer has been subjected to practical use.

Now, a polyamide obtained by polycondensation reaction of xylylenediamine and an aliphatic dicarboxylic acid, for example, a polyamide obtained with m-xylylenediamine and adipic acid (which is hereinafter referred to as nylon MXD6), exhibits a high strength, a high elastic modulus, and a low permeability to a gaseous substance, such as oxygen, carbon dioxide, odors and flavors, and thus is widely used as a gas barrier material in the field of packaging materials. Nylon MXD6 has good heat stability on melting, as compared to other gas barrier resins, and thus can be co-extruded or co-injection molded with a thermoplastic resin, such as polyethylene terephthalate (which is hereinafter abbreviated as PET), nylon 6 and polypropylene. Accordingly, nylon MXD6 is utilized as a gas barrier layer constituting a multilayer structure.

However, in the case where nylon MXD6 is mixed with another versatile resin or in the case where it is used as the gas barrier layer, not only oxygen cannot be blocked completely due to the slight oxygen permeability thereof, but also oxygen remaining in the gas in the head space present above the content after charging in the molded article cannot be removed. Accordingly, deterioration of contents that are sensitive to oxygen, such as beer, cannot be avoided.

As another measure for imparting the gas barrier property to the injection molded article containing a thermoplastic resin, such a method has been practiced that a gas barrier layer containing an ethylene-vinyl alcohol copolymer, polyacrylonitrile, polyvinylidene chloride, an aluminum foil, a carbon coating, an inorganic oxide vapor deposit, or the like is laminated as a constitutional material, but as similar to the case using nylon MXD6, oxygen remaining in the gas in the head space present above the content after charging in the molded article cannot be removed.

In recent years, a small amount of a transition metal compound is added and mixed with nylon MXD6 to impart an oxygen absorbing capability to nylon MXD6, which is utilized as an oxygen barrier material constituting a container or a packaging material, whereby oxygen penetrating from the outside of the container is absorbed by nylon MXD6, and simultaneously oxygen remaining inside the container is also absorbed by nylon MXD6, thereby further enhancing the storage stability of the content of the container as compared to a container utilizing an ordinary oxygen barrier thermoplastic resin (see, for example, Patent Documents 1 and 2).

An oxygen absorbent has been steadily used for removing oxygen in a container. For example, Patent Documents 3 and 4 disclose an oxygen absorbing multilayer material containing an oxygen absorbent, such as iron powder, dispersed in a resin. Patent Document 5 discloses a product containing an oxygen removing layer containing an ethylenic unsaturated compound, such as polybutadiene, and a transition metal catalyst, such as cobalt, and an oxygen barrier layer, such as polyamide.

CITATION LIST

Patent Literature

[Patent Document 1] JP-A-2003-341747
[Patent Document 2] Japanese Patent No. 2,991,437
[Patent Document 3] JP-A-2-72851
[Patent Document 4] JP-A-4-90848
[Patent Document 5] JP-A-5-115776

SUMMARY OF INVENTION

Technical Problem

An oxygen absorbing multilayer material containing an oxygen absorbent, such as iron powder, dispersed in a resin is opaque since the resin is colored with the oxygen absorbent, such as iron powder, and thus has restrictions in usage, i.e., they may not be used in a field of packaging requiring transparency.

A resin composition containing a transition metal, such as cobalt, has an advantage that the composition may be applied to a packaging container requiring transparency, but is not favorable therefor since the resin composition is colored with the transition metal catalyst. In the resin composition, furthermore, the resin is oxidized through absorption of oxygen by the transition metal catalyst. Specifically, it is considered that the oxidation of nylon MXD6 may occur through such reaction as generation of a radical due to withdrawal of a hydrogen atom of a methylene chain adjacent to an arylene group of the polyamide resin by the transition metal atom, generation of a peroxy radical caused by addition of an oxygen molecule to the radical, and withdrawal of a hydrogen atom by the peroxy radical. The resin is oxidized by oxygen absorption through the aforementioned mechanism, which results in such problems as generation of offensive odor in a content of a container due to decomposition products, and deterioration of the color, the strength and the like of the container due to oxidative degradation of the resin. The use thereof as a gas barrier layer results in a problem of occurrence of interlayer delamination with the lapse of time.

The problem to be solved by the present invention is to provide an injection molded article that exhibits an oxygen barrier capability, exhibits an oxygen absorbing capability without a transition metal contained, generates no substance that causes offensive odor or degradation of flavor, is excellent in storage stability of the content, and suffers considerably small decrease in strength through progress of oxygen absorption.

Solution to Problem

The present invention provides an injection molded article and a container thereof shown below.
(1) An injection molded article containing a resin composition containing a polyamide compound (A) and a resin (B), wherein the polyamide compound (A) contains:
from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more;
from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and
from 0.1 to 50% by mol of a constitutional unit represented by the following general formula (III):

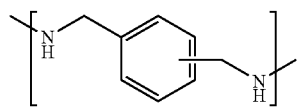
(I-1)

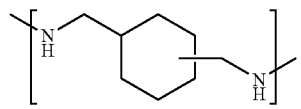
(I-2)

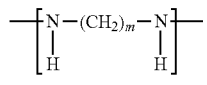
(I-3)

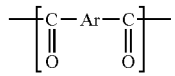
(II-1)

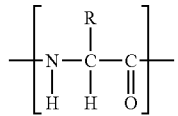
(II-2)

$$\left[\begin{array}{c} R \\ | \\ N-C-C \\ | \ | \ \| \\ H \ H \ O \end{array}\right]$$
(III)

wherein,
in the general formula (I-3), m represents an integer of from 2 to 18;
in the general formula (II-1), n represents an integer of from 2 to 18;
in the general formula (II-2), Ar represents an arylene group; and
in the general formula (III), R represents a substituted or unsubstituted alkyl group or a substituted or unsubstituted aryl group.
(2) A container obtained by processing the injection molded article.

Advantageous Effects of Invention

The injection molded article of the present invention exhibits an oxygen barrier capability, exhibits an oxygen absorbing capability without a transition metal contained, and suffers considerably small decrease in strength through progress of oxygen absorption.

The container obtained by processing the injection molded article is excellent in suppression of oxidative degradation of the content thereof, generates substantially no substance that causes offensive odor or degradation of flavor, and thus is excellent in flavor retaining property.

DESCRIPTION OF EMBODIMENTS

<<Injection Molded Article>>

The injection molded article of the present invention contains a resin composition containing a polyamide compound (A) and a resin (B).
1. Resin Composition Containing Polyamide Compound (A) and Resin (B)

In the present invention, the resin composition exhibits an oxygen absorbing capability and an oxygen barrier capability by using the particular polyamide compound described later (which may be hereinafter referred to as a polyamide compound (A)), contained therein. The polyamide compound (A) contained in the resin composition may be only one kind or a combination of two or more kinds thereof. The resin (B) contained in the resin composition may be only one kind or a combination of two or more kinds thereof.

The preferred range of the mass ratio of the polyamide compound (A) and the resin (B) in the resin composition used in the present invention may vary depending on the relative viscosity of the polyamide compound (A).

In the case where the relative viscosity of the polyamide compound (A) is 1.8 or more and 4.2 or less, the mass ratio of the polyamide compound (A)/the resin (B) is preferably selected from a range of from 5/95 to 95/5. The content of the polyamide compound (A) is more preferably 10 parts by mass or more, and further preferably 30 parts by mass or more, per 100 parts by mass in total of the polyamide compound (A) and the resin (B), from the standpoint of the oxygen absorbing capability and the oxygen barrier capability.

In the case where the relative viscosity of the polyamide compound (A) is 1.01 or more and less than 1.8, the resin (B) is preferably contained in a relatively large amount from the standpoint of the molding processability, and the mass ratio of the polyamide compound (A)/the resin (B) is preferably selected from a range of from 5/95 to 50/50. The content of the polyamide compound (A) is more preferably 10 parts by mass or more, and further preferably 30 parts by mass or more, per 100 parts by mass in total of the polyamide compound (A) and the resin (B), from the standpoint of the oxygen absorbing capability and the oxygen barrier capability.

The resin composition used in the present invention may contain, in addition to the polyamide compound (A) and the resin (B), an additive (which may be hereinafter referred to as an additive (C)) described later according to the desired capability, the total content of the polyamide compound (A) and the resin (B) in the resin composition is preferably from 90 to 100% by mass, and more preferably from 95 to 100% by mass, from the standpoint of the molding processability, the oxygen absorbing capability and the oxygen barrier capability.

The thickness of the injection molded article of the present invention is preferably in a range of from 3 to 5,000 μm, and more preferably in a range of from 10 to 4,500 μm, from the standpoint of ensuring the properties including the flexibility that are demanded for the injection molded article while enhancing the oxygen absorbing capability and the oxygen barrier capability.

1-1. Polyamide Compound (A)
<Constitution of Polyamide Compound (A)>

In the present invention, the polyamide compound (A) contains: from 25 to 50% by mol of a diamine unit, which contains at least one diamine unit selected from the group consisting of an aromatic diamine unit represented by the following general formula (I-1), an alicyclic diamine unit represented by the following general formula (I-2) and a linear aliphatic diamine unit represented by the following general formula (I-3), in an amount in total of 50% by mol or more; from 25 to 50% by mol of a dicarboxylic acid unit, which contains a linear aliphatic dicarboxylic acid unit represented by the following general formula (II-1) and/or an aromatic dicarboxylic acid unit represented by the following general formula (II-2), in an amount in total of 50% by mol or more; and from 0.1 to 50% by mol of a tertiary hydrogen-containing carboxylic acid unit (preferably, a constitutional unit represented by the following general formula (III)):

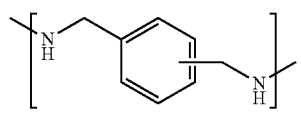
(I-1)

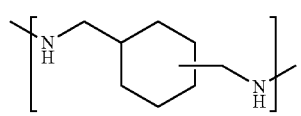
(I-2)

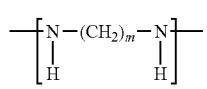
(I-3)

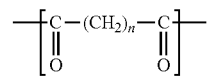
(II-1)

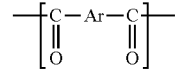
(II-2)

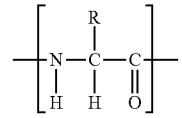
(III)

wherein, in the general formula (I-3), m represents an integer of from 2 to 18; in the general formula (II-1), n represents an integer of from 2 to 18; in the general formula (II-2), Ar represents an arylene group; and in the general formula (III), R represents a substituted or unsubstituted alkyl group or a substituted or unsubstituted aryl group.

The total content of the diamine unit, the dicarboxylic acid unit and the tertiary hydrogen-containing carboxylic acid unit does not exceed 100% by mol. The polyamide compound (A) may further contain a constitutional unit other than those mentioned above in such a range that does not impair the advantages of the present invention.

In the polyamide compound (A), the content of the tertiary hydrogen-containing carboxylic acid unit is from 0.1 to 50% by mol. When the content of the tertiary hydrogen-containing carboxylic acid unit is less than 0.1% by mol, a sufficient oxygen absorbing capability is not exhibited. When the content of the tertiary hydrogen-containing carboxylic acid unit exceeds 50% by mol, the properties of the polyamide compound (A), such as the gas barrier property and the mechanical property, are deteriorated since the amount of tertiary hydrogen contained is too large, and particularly in the case where the tertiary hydrogen-containing carboxylic acid is an amino acid, not only the heat resistance becomes insufficient due to a continuous peptide chain, but also a ring structure formed of a dimer of the amino acid is produced and inhibits the polymerization. The content of the tertiary hydrogen-containing carboxylic acid unit is preferably 0.2% by mol or more, and more preferably 1% by mol or more, and is preferably 40% by mol or less, and more preferably 30% by mol or less, from the standpoint of the oxygen absorbing capability and the properties of the polyamide compound (A).

In the polyamide compound (A), the content of the diamine unit is from 25 to 50% by mol, and from the standpoint of the oxygen absorbing capability and the properties of the polymer, is preferably from 30 to 50% by mol. In the polyamide compound (A), similarly, the content of the dicarboxylic acid unit is from 25 to 50% by mol, and preferably from 30 to 50% by mol.

The ratio of the contents of the diamine unit and the dicarboxylic acid unit is preferably approximately the same amounts, and more preferably the content of the dicarboxylic acid unit is ±2% by mol of the content of the diamine unit, from the standpoint of the polymerization reaction. When the content of the dicarboxylic acid unit deviates from the range of ±2% by mol of the content of the diamine unit, it is difficult to increase the polymerization degree of the polyamide compound (A), and a long period of time is required for increasing the polymerization degree, which may cause thermal degradation.

[Diamine Unit]

The diamine unit in the polyamide compound (A) contains at least one diamine unit selected from the group consisting of an aromatic diamine unit represented by the general formula (I-1), an alicyclic diamine unit represented by the general formula (I-2) and a linear aliphatic diamine unit represented by the general formula (I-3), in an amount in total of 50% by mol or more based on the diamine units, and the content thereof is preferably 70% by mol or more, more preferably 80% by mol or more, and further preferably 90% by mol or more, and is preferably 100% by mol or less.

Examples of the compound capable of constituting the aromatic diamine unit represented by the general formula (I-1) include o-xylylenediamine, m-xylylenediamine and p-xylylenediamine. These compounds may be used solely or as a combination of two or more kinds thereof.

Examples of the compound capable of constituting the alicyclic diamine unit represented by the general formula (I-2) include a bis(aminomethyl)cyclohexane compound, such as 1,3-bis(aminomethyl)cyclohexane and 1,4-bis(aminomethyl)cyclohexane. These compounds may be used solely or as a combination of two or more kinds thereof.

The bis(aminomethyl)cyclohexane compound has structural isomers, and good moldability with high crystallinity may be obtained by increasing the content of the cis-isomer. On the other hand, when the content of the cis-isomer is decreased, a transparent article having low crystallinity may be obtained. Therefore, in the case where the crystallinity is to be increased, the content of the cis-isomer in the bis(aminomethyl)cyclohexane compound is preferably 70% by mol or more, more preferably 80% by mol or more, and further preferably 90% by mol or more. In the case where the crystallinity is to be decreased, the content of the cis-isomer in the bis(aminomethyl)cyclohexane compound is preferably 50% by mol or less, more preferably 40% by mol or less, and further preferably 30% by mol or less.

In the general formula (I-3), m represents an integer of from 2 to 18, preferably from 3 to 16, more preferably from 4 to 14, and further preferably from 6 to 12.

Examples of the compound capable of constituting the linear aliphatic diamine unit represented by the general formula (I-3) include an aliphatic diamine, such as ethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine, but are not limited thereto. Among these, hexamethylenediamine is preferred. These compounds may be used solely or as a combination of two or more kinds thereof.

The diamine unit in the polyamide compound (A) preferably contains the aromatic diamine unit represented by the general formula (I-1) and/or the alicyclic diamine unit represented by the general formula (I-2) from the standpoint of imparting excellent gas barrier property to the polyamide compound (A), and enhancing the transparency and the color tone and improving the moldability as a versatile thermoplastic resin, and preferably contains the linear aliphatic diamine unit represented by the general formula (I-3) from the standpoint of imparting suitable crystallinity to the polyamide compound (A). In particular, the diamine unit preferably contains the aromatic diamine unit represented by the general formula (I-1) from the standpoint of the oxygen absorbing capability and the properties of the polyamide compound (A).

The diamine unit in the polyamide compound (A) preferably contains a m-xylylenediamine unit in an amount of 50% by mol or more from the standpoint of exhibiting the excellent gas barrier property by the polyamide compound (A), and improving the moldability as a versatile thermoplastic resin, and the content thereof is preferably 70% by mol or more, more preferably 80% by mol or more, and further preferably 90% by mol or more, and is preferably 100% by mol or less.

Examples of the compound capable of constituting other diamine units than the diamine unit represented by one of the general formulae (I-1) to (I-3) include an aromatic diamine such as p-phenylenediamine, an alicyclic diamine such as 1,3-diaminocyclohexane and 1,4-diaminocyclohexane, an aliphatic diamine such as N-methylethylenediamine, 2-methyl-1,5-pentanediamine and 1-amino-3-aminomethyl-3,5,5-trimethylcyclohexane, and a polyether diamine having an ether bond represented by Jeffamine and Elastamine (both trade names), produced by Huntsman International LLC, but are not limited thereto. These compounds may be used solely or as a combination of two or more kinds thereof.

[Dicarboxylic Acid Unit]

The dicarboxylic acid unit in the polyamide compound (A) contains a linear aliphatic dicarboxylic acid unit represented by the following general formula (II-1) and/or an aromatic dicarboxylic acid unit represented by the following general formula (II-2), in an amount in total of 50% by mol or more based on the dicarboxylic acid units, from the standpoint of the reactivity upon polymerization, and the crystallinity and the moldability of the polyamide compound (A), and the content thereof is preferably from 70% by mol or more, more preferably 80% by mol or more, and further preferably 90% by mol or more, and is preferably 100% by mol or less.

The linear aliphatic dicarboxylic acid unit represented by the general formula (II-1) is preferred for imparting a suitable glass transition temperature and crystallinity to the polyamide compound (A), and for imparting thereto flexibility that is required for a packaging material and a packaging container.

In the general formula (II-1), n represents an integer of from 2 to 18, preferably from 3 to 16, more preferably from 4 to 12, and further preferably from 4 to 8.

Examples of the compound capable of constituting the linear aliphatic dicarboxylic acid unit represented by the general formula (II-1) include succinic acid, glutaric acid, adipic acid, pimelic acid, suberic acid, azelaic acid, sebacic acid, 1,10-decanedicarboxylic acid, 1,11-undecanedicarboxylic acid and 1,12-dodecanedicarboxylic acid, but are not limited thereto. These compounds may be used solely or as a combination of two or more kinds thereof.

The kind of the linear aliphatic dicarboxylic acid unit represented by the general formula (II-1) may be appropriately determined depending on the purposes. The linear aliphatic dicarboxylic acid unit in the polyamide compound (A) preferably contains at least one selected from the group consisting of an adipic acid unit, a sebacic acid unit and a 1,12-dodecanedicarboxylic acid unit, in an amount in total of 50% by mol or more based on the linear aliphatic dicarboxylic acid units, from the standpoint of imparting excellent gas barrier property to the polyamide compound (A), and maintaining the heat resistance of a packaging material and a packaging container after thermal sterilization, and the content thereof is more preferably 70% by mol or more, further preferably 80% by mol or more, and particularly preferably 90% by mol or more, and is preferably 100% by mol or less.

The linear aliphatic dicarboxylic acid unit in the polyamide compound (A) preferably contains an adipic acid unit in an amount of 50% by mol or more based on the linear aliphatic dicarboxylic acid units from the standpoint of the gas barrier property and the suitable thermal properties, such as the glass transition temperature and the melting point, of the polyamide compound (A). The linear aliphatic dicarboxylic acid unit in the polyamide compound (A) preferably contains a sebacic acid unit in an amount of 50% by mol or more based on the linear aliphatic dicarboxylic acid units from the standpoint of imparting suitable gas barrier property and molding suitability to the polyamide compound (A), and in the case where the polyamide compound (A) is applied to such a purpose that requires low water absorbing property, weather resistance and heat resistance, the linear aliphatic dicarboxylic acid unit preferably contains a 1,12-dodecanedicarboxylic acid unit in an amount of 50% by mol or more based on the linear aliphatic dicarboxylic acid units.

The aromatic dicarboxylic acid unit represented by the general formula (II-2) is preferred for imparting further gas barrier property to the polyamide compound (A), and for facilitating the molding processability of a packaging material and a packaging container.

In the general formula (II-2), Ar represents an arylene group. The arylene group is preferably an arylene group having from 6 to 30 carbon atoms, and more preferably an arylene group having from 6 to 15 carbon atoms, and examples thereof include a phenylene group and a naphthylene group.

Examples of the compound capable of constituting the aromatic dicarboxylic acid unit represented by the general formula (II-2) include terephthalic acid, isophthalic acid and 2,6-naphthalenedicarboxylic acid, but are not limited thereto. These compounds may be used solely or as a combination of two or more kinds thereof The kind of the aromatic dicarboxylic acid unit represented by the general formula (II-2) may be appropriately determined depending on the purposes. The aromatic dicarboxylic acid unit in the polyamide compound (A) preferably contains at least one selected from the group consisting of an isophthalic acid unit, a terephthalic acid unit and a 2,6-naphthalenedicarboxylic acid unit, in an amount in total of 50% by mol or more based on the aromatic dicarboxylic acid units, and the content thereof is more preferably 70% by mol or more, further preferably 80% by mol or more, and particularly preferably 90% by mol or more, and is preferably 100% by mol or less. Among these units, isophthalic acid and/or terephthalic acid are preferably contained in the aromatic dicarboxylic acid unit. The content ratio of the isophthalic acid unit and the terephthalic acid unit (isophthalic acid unit/terephthalic acid unit) is not particularly limited and may be determined depending on the purposes. For example, from the standpoint of providing a suitable glass transition temperature and decreasing the crystallinity, the molar ratio is preferably from 0/100 to 100/0, more preferably from 0/100 to 60/40, further preferably from 0/100 to 40/60, and still further preferably from 0/100 to 30/70, with the total of both the units being 100.

In the dicarboxylic acid unit in the polyamide compound (A), the content ratio of the linear aliphatic dicarboxylic acid unit and the aromatic dicarboxylic acid unit (linear aliphatic dicarboxylic acid unit/aromatic dicarboxylic acid unit) is not particularly limited and may be appropriately determined depending on the purposes. For example, in the case where the glass transition temperature of the polyamide compound (A) is to be increased, and the crystallinity of the polyamide compound (A) is to be decreased, the molar ratio (linear aliphatic dicarboxylic acid unit/aromatic dicarboxylic acid unit) is preferably from 0/100 to 60/40, more preferably from 0/100 to 40/60, and further preferably from 0/100 to 30/70, with the total of both the units being 100. In the case where the glass transition temperature of the polyamide compound (A) is to be decreased for imparting flexibility to the polyamide compound (A), the molar ratio (linear aliphatic dicarboxylic acid unit/aromatic dicarboxylic acid unit) is preferably from 40/60 to 100/0, more preferably from 60/40 to 100/0, and further preferably from 70/30 to 100/0, with the total of both the units being 100.

Examples of the compound capable of constituting other dicarboxylic acid units than the dicarboxylic acid unit represented by the general formula (II-1) or (II-2) include dicarboxylic acids such as oxalic acid, malonic acid, fumaric acid, maleic acid, 1,3-benzenediacetic acid and 1,4-benzenediacetic acid, but are not limited thereto.

[Tertiary Hydrogen-Containing Carboxylic Acid Unit]

In the present invention, the tertiary hydrogen-containing carboxylic acid unit in the polyamide compound (A) has at least one each of an amino group and a carboxyl group, or has two or more of carboxyl groups, from the standpoint of the polymerization of the polyamide compound (A). Specific examples thereof include constitutional units represented by any one of the following general formulae (III), (IV) and (V):

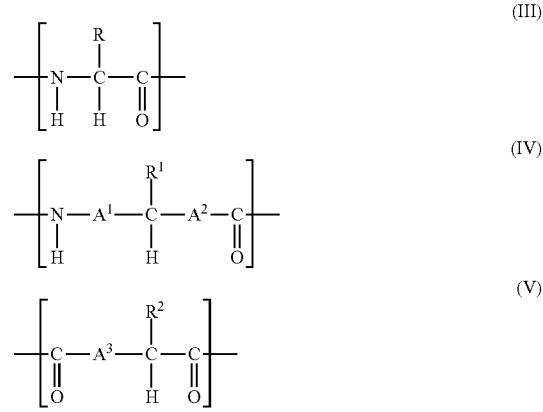

wherein, in the general formulae (III) to (V), R, $R^1$ and $R^2$ each represent a substituent, and $A^1$ to $A^3$ each represent a single bond or a divalent linking group, provided that the case where both $A^1$ and $A^2$ are single bonds in the general formula (IV) is excluded.

The polyamide compound (A) of the present invention contains the tertiary hydrogen-containing carboxylic acid unit. Owing to the tertiary hydrogen-containing carboxylic acid unit contained as a copolymerization component, the polyamide compound (A) exhibits an excellent oxygen absorbing capability without a transition metal contained.

The mechanism where the polyamide compound (A) containing the tertiary hydrogen-containing carboxylic acid unit exhibits a good oxygen absorbing capability in the present invention has not yet been clarified, but may be expected as follows. A compound capable of constituting the tertiary hydrogen-containing carboxylic acid unit has an electron withdrawing group and an electron donating group, both of which are bonded on the same carbon atom, and it is thus considered that a very stable radical is formed through a phenomenon referred to as the captodative effect where the unpaired electron present on the carbon atom is energetically stabilized. Specifically, the carboxyl group, which is an electron withdrawing group, makes electron deficient (δ+) the adjacent carbon having the tertiary hydrogen bonded thereto, and thus the tertiary hydrogen also becomes electron deficient (δ+), and is dissociated as a proton, thereby forming a radical. When oxygen and water are present therewith, it is considered that oxygen is reacted with the radical, and an oxygen absorbing capability is exhibited. It has been found that higher reactivity is obtained in an environment with a higher humidity and a higher temperature.

In the general formulae (III) to (V), R, $R^1$ and $R^2$ each represent a substituent. Examples of the substituent represented by R, $R^1$ and $R^2$ include a halogen atom (such as a chlorine atom, a bromine atom and an iodine atom), an alkyl group (such as a linear, branched or cyclic alkyl group having from 1 to 15 carbon atoms, and preferably from 1 to 6 carbon atoms, e.g., a methyl group, an ethyl group, a n-propyl group, an isopropyl group, a t-butyl group, a n-octyl group, a 2-ethylhexyl group, a cyclopropyl group and a cyclopentyl group), an alkenyl group (such as a linear, branched or cyclic alkenyl group having from 2 to 10 carbon atoms, and preferably from 2 to 6 carbon atoms, e.g., a vinyl group and an allyl group), an alkynyl group (such as an alkynyl group having from 2 to 10 carbon atoms, and preferably from 2 to 6 carbon atoms, e.g., an ethynyl group and a propargyl group), an aryl group (such as an aryl group having from 6 to 16 carbon atoms, and preferably from 6 to 10 carbon atoms, e.g., a phenyl group and a naphthyl group), a heterocyclic group (such as a monovalent group having from 1 to 12 carbon atoms, and preferably from 2 to 6 carbon atoms, which is obtained by removing one hydrogen atom from a 5-membered or 6-membered aromatic or nonaromatic heterocyclic compound, e.g., a 1-pyrazolyl group, a 1-imidazolyl group and a 2-furyl group), a cyano group, a hydroxyl group, a nitro group, an alkoxy group (such as a linear, branched or cyclic alkoxy group having from 1 to 10 carbon atoms, and preferably from 1 to 6 carbon atoms, e.g., a methoxy group and an ethoxy group), an aryloxy group (such as an aryloxy group having from 6 to 12 carbon atoms, and preferably from 6 to 8 carbon atoms, e.g., a phenoxy group), an acyl group (such as a formyl group, an alkylcarbonyl group having from 2 to 10 carbon atoms, and preferably from 2 to 6 carbon atoms, and an arylcarbonyl group having from 7 to 12 carbon atoms, and preferably from 7 to 9 carbon atoms, e.g., an acetyl group, a pivaloyl group and a benzoyl group), an amino group (such as an amino group, an alkylamino group having from 1 to 10 carbon atoms, and preferably from 1 to 6 carbon atoms, an anilino group having from 6 to 12 carbon atoms, and preferably from 6 to 8 carbon atoms, and a heterocyclic amino group having from 1 to 12 carbon atoms, and preferably from 2 to 6 carbon atoms, e.g., an amino group, a methylamino group and an anilino group), a mercapto group, an alkylthio group (such as an alkylthio group having from 1 to 10 carbon atoms, and preferably from 1 to 6 carbon atoms, e.g., a methylthio group and an ethylthio group), an arylthio group (such as an arylthio group having from 6 to 12 carbon atoms, and preferably from 6 to 8 carbon atoms, e.g., a phenylthio group), a heterocyclic thio group (such as a heterocyclic thio group having from 2 to 10 carbon atoms, and preferably from 2 to 6 carbon atoms, e.g., a 2-benzothiazolylthio group), and an imide group (such as an imide group having from 2 to 10 carbon atoms, and preferably from 4 to 8 carbon atoms, e.g., an N-succinimide group and an N-phthalimide group).

Among these functional groups, those having a hydrogen atom may be further substituted by the aforementioned groups, and examples thereof include an alkyl group substituted with a hydroxyl group (such as a hydroxyethyl group), an alkyl group substituted with an alkoxy group (such as a methoxyethyl group), an alkyl group substituted with an aryl group (such as a benzyl group), an aryl group substituted with an alkyl group (such as a p-tolyl group) and an aryloxy group substituted with an alkyl group (such as a 2-methylphenoxy group), but are not limited thereto.

In the case where the functional group is further substituted, the number of carbon atoms mentioned above does not contain the number of carbon atoms of the further substituent. For example, a benzyl group is considered as an alkyl group having one carbon atom substituted with a phenyl group, but is not considered as an alkyl group having 7 carbon atoms substituted with a phenyl group. The numbers of carbon atoms described hereinbelow are to be similarly understood unless otherwise indicated.

In the general formulae (IV) and (V), $A^1$ to $A^3$ each represent a single bond or a divalent linking group. In the general formula (IV), the case where both $A^1$ and $A^2$ are single bonds is excluded. Examples of the divalent linking group include a linear, branched or cyclic alkylene group (such as an alkylene group having from 1 to 12 carbon atoms, and preferably from 1 to 4 carbon atoms, e.g., a methylene group and an ethylene group), an aralkylene group (such as an aralkylene group having from 7 to 30 carbon atoms, and preferably from 7 to 13 carbon atoms, e.g., a benzylidene group) and an arylene group (such as an arylene group having from 6 to 30 carbon atoms, and preferably from 6 to 15 carbon atoms, e.g., a phenylene group). These groups may further have a substituent, and examples of the substituent include those exemplified as the functional groups for R, $R^1$ and $R^2$. Examples thereof include an arylene group substituted with an alkyl group (such as a xylylene group), but are not limited thereto.

The polyamide compound (A) of the present invention preferably contains at least one kind of the constitutional units represented by any one of the general formulae (III), (IV) and (V). Among these, a carboxylic acid unit having tertiary hydrogen on an α-carbon (a carbon atom that is adjacent to the carboxyl group) is preferred, and a constitutional unit represented by the general formula (III) is particularly preferred from the standpoint of the availability of the raw material and the enhancement of the oxygen absorbing capability.

The substituent R in the general formula (III) has been described above, and among them, a substituted or unsubstituted alkyl group and a substituted or unsubstituted aryl group are preferred, a substituted or unsubstituted alkyl group having from 1 to 6 carbon atoms and a substituted or unsubstituted aryl group having from 6 to 10 carbon atoms are more preferred, and a substituted or unsubstituted alkyl group having from 1 to 4 carbon atoms and a substituted or unsubstituted phenyl group are particularly preferred.

Preferred examples of R include a methyl group, an ethyl group, a n-propyl group, an isopropyl group, a n-butyl group, a t-butyl group, a 1-methylpropyl group, a 2-methylpropyl group, a hydroxymethyl group, a 1-hydroxyethyl group, a mercaptomethyl group, a methylsulfanylethyl group, a phenyl group, a naphthyl group, a benzyl group and a 4-hydroxybenzyl group, but are not limited thereto. Among these, a methyl group, an ethyl group, an isopropyl group, a 2-methylpropyl group and a benzyl group are more preferred.

Examples of the compound capable of constituting the constitutional unit represented by the general formula (III) include α-amino acids such as alanine, 2-aminobutyric acid, valine, norvaline, leucine, norleucine, tert-leucine, isoleucine, serine, threonine, cysteine, methionine, 2-phenylglycine, phenylalanine, tyrosine, histidine, tryptophan and proline, but are not limited thereto.

Examples of the compound capable of constituting the constitutional unit represented by the general formula (IV) include β-amino acids such as 3-aminobutyric acid, and examples of the compound capable of constituting the constitutional unit represented by the general formula (V) include dicarboxylic acids such as methylmalonic acid, methylsuccinic acid, malic acid and tartaric acid, but are not limited thereto.

These compounds may be a D-isomer, an L-isomer or a racemic substance, and may also be an allo-isomer. These compounds may be used solely or as a combination of two or more kinds thereof.

Among these, an α-amino acid having tertiary hydrogen on an α-carbon is particularly preferred from the standpoint of the availability of the raw material, the enhancement of the oxygen absorbing capability and the like. In the α-amino acid, alanine is most preferred from the standpoint of the availability, the low cost, the easiness of polymerization, and the low yellowness index (YI) of the polymer. Alanine has a relatively low molecular weight and thus exhibits a high polymerization ratio per 1 g of the polyamide compound (A), and therefore, alanine provides a good oxygen absorbing capability per 1 g of the polyamide compound (A).

The purity of the compound capable of constituting the tertiary hydrogen-containing carboxylic acid unit is preferably 95% or more, more preferably 98.5% or more, and further preferably 99% or more, from the standpoint of the influence on polymerization such as delay of the polymerization rate, and the influence on the product quality such as the yellowness index of the polymer. The amount of a sulfate ion and an ammonium ion contained as impurities is preferably 500 ppm or less, more preferably 200 ppm or less, and further preferably 50 ppm or less.

[ω-Aminocarboxylic Acid Unit]

The polyamide compound (A) of the present invention may further contain an ω-aminocarboxylic acid unit represented by the following general formula (X), in addition to the diamine unit, the dicarboxylic acid unit and the tertiary hydrogen-containing carboxylic acid unit, in the case where the polyamide compound (A) requires flexibility or the like.

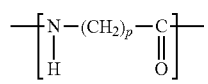 (X)

wherein, in the general formula (X), p represents an integer of from 2 to 18.

The content of the ω-aminocarboxylic acid unit is preferably from 0.1 to 49.9% by mol, more preferably from 3 to 40% by mol, and further preferably from 5 to 35% by mol, based on the total constitutional units of the polyamide compound (A). The total content of the diamine unit, the dicarboxylic acid unit, the tertiary hydrogen-containing carboxylic acid unit and the ω-aminocarboxylic acid unit does not exceed 100% by mol.

In the general formula (X), p represents an integer of from 2 to 18, preferably from 3 to 16, more preferably from 4 to 14, and further preferably from 5 to 12.

Examples of the compound capable of constituting the ω-aminocarboxylic acid unit represented by the following general formula (X) include an ω-aminocarboxylic acid having from 5 to 19 carbon atoms and a lactam having from 5 to 19 carbon atoms. Examples of the ω-aminocarboxylic acid having from 5 to 19 carbon atoms include 6-aminohexanoic acid and 12-aminododecanoic acid, and examples of the lactam having from 5 to 19 carbon atoms include ε-caprolactam and laurolactam, but are not limited thereto. These compounds may be used solely or as a combination of two or more kinds thereof.

The ω-aminocarboxylic acid unit preferably contains a 6-aminohexanoic acid unit and/or a 12-aminododecanoic acid unit in an amount in total of 50% by mol or more based on the ω-aminocarboxylic acid units, and the content thereof is more preferably 70% by mol or more, more preferably 80% by mol or more, and further preferably 90% by mol or more, and is preferably 100% by mol or less.

[Polymerization Degree of Polyamide Compound (A)]

With respect to the polymerization degree of the polyamide compound (A), a relative viscosity is used. The relative viscosity of the polyamide compound (A) is preferably from 1.01 to 4.2 while not particularly limited.

As described above, the preferred range of the mass ratio of the polyamide compound (A)/the resin (B) may vary depending on the relative viscosity of the polyamide compound (A), and in the case where the relative viscosity of the polyamide compound (A) is 1.8 or more and 4.2 or less, the mass ratio of the polyamide compound (A)/the resin (B) is preferably selected from a range of from 5/95 to 95/5, and in the case where the relative viscosity of the polyamide compound (A) is 1.01 or more and less than 1.8, the mass ratio of the polyamide compound (A)/the resin (B) is preferably selected from a range of from 5/95 to 50/50.

The relative viscosity referred herein is a ratio of the fall time (t) of the polyamide compound (A) measured by dissolving 1 g of the polyamide compound (A) in 100 mL of 96% sulfuric acid and measuring the resulting solution with a Cannon-Fenske viscometer at 25° C., and the fall time ($t_0$) of 96% sulfuric acid measured in the same manner, and shown by the following expression.

Relative viscosity=$t/t_0$

[Terminal Amino Group Concentration]

The oxygen absorption rate of the polyamide compound (A) and the oxidative degradation of the polyamide compound (A) due to oxygen absorption may be controlled by changing the terminal amino group concentration of the polyamide compound (A). In the present invention, the terminal amino group concentration of the polyamide compound (A) is preferably in a range of from 5 to 150 μeq/g, more preferably from 10 to 100 μeq/g, and further preferably from 15 to 80 μeq/g, from the standpoint of the balance between the oxygen absorption rate and the oxidative degradation.

<Production Method of Polyamide Compound (A)>

The polyamide compound (A) may be produced by polycondensation of a diamine component capable of constituting the diamine unit, a dicarboxylic acid component capable of constituting the dicarboxylic acid unit, a tertiary hydrogen-containing carboxylic acid component capable of constituting the tertiary hydrogen-containing carboxylic acid unit, and depending on necessity, an ω-aminocarboxylic acid component capable of constituting the ω-aminocarboxylic acid unit. The polymerization degree thereof may be controlled by adjusting the polycondensation conditions and the like. As a molecular weight controlling agent, a small amount of a monoamine and a monocarboxylic acid may be added upon polycondensation. Furthermore, for providing an intended polymerization degree by suppressing the polycondensation reaction, the ratio (molar ratio) of the diamine component and the carboxylic acid component constituting the polyamide compound (A) may be deviated from 1.

Examples of the polycondensation method of the polyamide compound (A) include a reactive extrusion method, a pressurized salt method, an atmospheric dropping method and a pressurized dropping method, but are not limited thereto. The reaction temperature is preferably as low as possible, and thereby the polyamide compound (A) may be prevented from suffering yellowing or gelation, and the polyamide compound (A) having stable properties may be obtained.

[Reactive Extrusion Method]

In the reactive extrusion method, a polyamide prepared from the diamine component and the dicarboxylic acid component (i.e., a polyamide corresponding to a precursor of the polyamide compound (A)) or a polyamide prepared from the diamine component, the dicarboxylic acid component and the ω-aminocarboxylic acid component (i.e., a polyamide corresponding to a precursor of the polyamide compound (A)) is reacted with the tertiary hydrogen-containing carboxylic acid component by melt-kneading in an extruder. In this method, the tertiary hydrogen-containing carboxylic acid component is incorporated into the skeleton of the polyamide through amide exchange reaction, and for performing the reaction sufficiently, it is preferred to use a screw suitable for the reactive extrusion and a twin screw extruder having a large L/D ratio. This method is convenient and suitable for producing the polyamide compound (A) that contains a small amount of the tertiary hydrogen-containing carboxylic acid unit.

[Pressurized Salt Method]

In the pressurized salt method, a nylon salt as a raw material is subjected to melt polycondensation under increased pressure. Specifically, a nylon salt aqueous solution containing the diamine component, the dicarboxylic acid component, the tertiary hydrogen-containing carboxylic acid component, and depending on necessity the ω-aminocarboxylic acid component is prepared, and then the aqueous solution is concentrated and then subjected to polycondensation by increasing the temperature thereof under increased pressure while removing condensation water. While returning the inside of the reaction vessel gradually to the atmospheric pressure, the temperature is increased to a temperature higher by approximately 10° C. than the melting point of the polyamide compound (A) and maintained, and then while the pressure is decreased gradually to −0.02 MPaG, the temperature is maintained for continuously performing the polycondensation. After reaching the agitation torque to a constant value, the inside of the reaction vessel is pressurized with nitrogen to approximately 0.3 MPaG, thereby recovering the polyamide compound (A).

The pressurized salt method is useful in the case where a volatile component is used as a monomer, and is a preferred polycondensation method in the case where the copolymerization ratio of the tertiary hydrogen-containing carboxylic acid component is large. The method is particularly preferred for producing the polyamide compound (A) containing the tertiary hydrogen-containing carboxylic acid unit in an amount of 15% by mol or more based on the total constitutional units of the polyamide compound (A). The use of the pressurized salt method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide compound (A) having excellent properties.

[Atmospheric Dropping Method]

In the atmospheric dropping method, the diamine component is continuously added dropwise to a mixture obtained by melting under heat the dicarboxylic acid component, the tertiary hydrogen-containing carboxylic acid component, and depending on necessity, the ω-aminocarboxylic acid component, thereby performing the polycondensation while removing condensation water. The polycondensation reaction is performed under heating the reaction system, thereby preventing the reaction temperature from becoming lower than the melting point of the polyamide compound (A) produced.

As compared to the pressurized salt method, the atmospheric dropping method provides a larger yield per batch because no water for dissolving the salt is used, and undergoes less decrease in reaction rate because vaporization and condensation of the raw material components, thereby shortening the process time.

[Pressurized Dropping Method]

In the pressurized dropping method, the dicarboxylic acid component, the tertiary hydrogen-containing carboxylic acid component, and depending on necessity, the ω-aminocarboxylic acid component are charged in a polycondensation vessel, and the components are melt-mixed by agitation to prepare a mixture. Subsequently, while pressurizing the inside of the vessel to approximately from 0.3 to 0.4 MPaG, the diamine component is continuously added dropwise to the mixture, thereby performing the polycondensation while removing condensation water. At this time, the polycondensation reaction is performed under heating the reaction system, thereby preventing the reaction temperature from becoming lower than the melting point of the polyamide compound (A) produced. After reaching the prescribed molar ratio, the dropwise addition of the diamine component is terminated. Then, while returning the inside of the vessel gradually to the atmospheric pressure, the temperature is increased to a temperature higher by approximately 10° C. than the melting point of the polyamide compound (A) and maintained, and then while the pressure is decreased gradually to −0.02 MPaG, the temperature is maintained for continuously performing the polycondensation. After reaching the agitation torque to a constant value, the inside of the vessel is pressurized with nitrogen to approximately 0.3 MPaG, thereby recovering the polyamide compound (A).

As similar to the pressurized salt method, the pressurized dropping method is useful in the case where a volatile component is used as a monomer, and is a preferred polycondensation method in the case where the copolymerization ratio of the tertiary hydrogen-containing carboxylic acid component is large. The method is particularly preferred for producing the polyamide compound (A) containing the tertiary hydrogen-containing carboxylic acid unit in an amount of 15% by mol or more based on the total constitutional units of the polyamide compound (A). The use of the pressurized dropping method prevents the tertiary hydrogen-containing carboxylic acid component from evaporating, and furthermore prevents the tertiary hydrogen-containing carboxylic acid component from undergoing polycondensation solely, and thus the polycondensation reaction can be smoothly performed, thereby providing the polyamide compound (A) having excellent properties. Moreover, as compared to the pressurized salt method, the pressurized dropping method provides a larger yield per batch because no water for dissolving the salt is used, and can shorten the reaction time as similar to the atmospheric dropping method, thereby providing the polyamide compound (A) with a low yellowness index through prevention of gelation or the like.

[Step of Increasing Polymerization Degree]

The polyamide compound (A) thus produced by the aforementioned polycondensation methods may be used as it is, or may further be subjected to a step of further increasing the polymerization degree. Examples of the step of further increasing the polymerization degree include reactive extrusion in an extruder and solid phase polymerization. Preferred examples of a heating device used for solid phase polymerization include a continuous heating and drying device, a rotation drum heating device which is referred to as a tumble dryer, a conical dryer and a rotary dryer, and a conical heating device having a rotary blade inside the device which is referred to as a Nauta mixer, but are not limited thereto, and known methods and devices may be used. Particularly, in the case where the polyamide compound (A) is subjected to solid phase polymerization, the rotation drum heating device is preferred among the above devices since the system can be sealed, and thereby the polycondensation can be performed in a state where oxygen causing coloration is removed.

[Phosphorus Atom-Containing Compound and Alkali Metal Compound]

In the polycondensation of the polyamide compound (A), a phosphorus atom-containing compound is preferably added from the standpoint of acceleration of the amidation reaction.

Examples of the phosphorus atom-containing compound include a phosphinic acid compound, such as dimethylphosphinic acid and phenylmethylphosphinic acid; a hypophosphorous acid compound, such as hypophosphorous acid, sodium hypophosphite, potassium hypophosphite, lithium hypophosphite, magnesium hypophosphite, calcium hypophosphite and ethyl hypophosphite; a phosphonic acid compound, such as phosphonic acid, sodium phosphonate, potassium phosphonate, lithium phosphonate, magnesium phosphonate, calcium phosphonate, phenylphosphonic acid, ethylphosphonic acid, sodium phenylphosphonate, potassium phenylphosphonate, lithium phenylphosphonate, diethyl phenylphosphonate, sodium ethylphosphonate and potassium ethylphosphonate; a phosphonous acid compound, such as phosphonous acid, sodium phosphonite, lithium phosphonite, potassium phosphonite, magnesium phosphonite, calcium phosphonite, phenylphosphonous acid, sodium phenylphosphonite, potassium phenylphosphonite, lithium phenylphosphonite and ethyl phenylphosphonite; and a phosphorous acid compound, such as phosphorous acid, sodium hydrogen phosphite, sodium phosphite, lithium phosphite, potassium phosphite, magnesium phosphite, calcium phosphite, triethyl phosphite, triphenyl phosphite and pyrophosphorous acid.

Among these, a metal salt of hypophosphorous acid, such as sodium hypophosphite, potassium hypophosphite and lithium hypophosphite, is preferably used since it greatly accelerates the amidation reaction and is excellent in prevention of coloration, and sodium hypophosphite is particularly preferred. The phosphorus atom-containing compound that can be used in the present invention is not limited to these compounds.

The amount of the phosphorus atom-containing compound added is preferably from 0.1 to 1,000 ppm, more preferably from 1 to 600 ppm, and further preferably from 5 to 400 ppm, in terms of phosphorus atom concentration in the polyamide compound (A). When the amount thereof is 0.1 ppm or more, the polyamide compound (A) is hard to be colored during the polymerization, thereby providing high transparency. When the amount thereof is 1,000 ppm or less, the polyamide compound (A) is hard to be gelled, and fish eyes, which are considered to be caused by the phosphorus atom-containing compound, can be suppressed from being contained in a molded article, thereby providing a molded article with a good appearance.

In the polycondensation system of the polyamide compound (A), an alkali metal compound is preferably added in combination with the phosphorus atom-containing compound. For preventing the polyamide compound (A) from being colored during the polycondensation, the phosphorus atom-containing compound is necessarily present in a sufficient amount, but it may cause gelation of the polyamide compound (A) in some cases, and therefore, an alkali metal compound is preferably used in combination therewith for controlling the amidation reaction rate.

Preferred examples of the alkali metal compound include an alkali metal hydroxide, an alkali metal acetate salt, an alkali metal carbonate salt and an alkali metal alkoxide. Specific examples of the alkali metal compound capable of being used in the present invention include lithium hydroxide, sodium hydroxide, potassium hydroxide, rubidium hydroxide, cesium hydroxide, lithium acetate, sodium acetate, potassium acetate, rubidium acetate, cesium acetate, sodium methoxide, sodium ethoxide, sodium propoxide, sodium butoxide, potassium methoxide, lithium methoxide and sodium carbonate. The alkali metal compound may be used without limitation to these compounds. The ratio (molar ratio) of the phosphorus atom-containing compound and the alkali metal compound, phosphorus atom-containing compound/alkali metal compound, is preferably from 1.0/0.05 to 1.0/1.5, more preferably from 1.0/0.1 to 1.0/1.2, and further preferably from 1.0/0.2 to 1.0/1.1, from the standpoint of controlling the polymerization rate and lowering the yellowness index.

1-2. Resin (B)

In the present invention, the resin (B) used may be an arbitrary resin without any particular limitation. Examples of the resin (B) include a thermoplastic resin, and specific examples thereof include a polyolefin, a polyester, a polyamide, an ethylene-vinyl alcohol copolymer, and a plant-derived resin. In the present invention, the resin (B) preferably contains at least one selected from the group consisting of these resins.

Among these, for exhibiting the oxygen absorbing capability effectively, a resin having high oxygen barrier property, such as a polyester, a polyamide and an ethylene-vinyl alcohol copolymer, is more preferred.

The mixing operation of the polyamide compound (A) and the resin (B) may be performed by a known method, examples of which include dry mixing and melt mixing. In the case where the polyamide compound (A) and the resin (B) are melt-mixed for producing desired pellets and molded articles, they may be melt-mixed by using an extruder or the like. The extruder used may be a known extruder, such as a single screw extruder and a twin screw extrude, but is not limited thereto.

[Polyolefin]

Specific examples of the polyolefin include an olefin homopolymer, such as polyethylene (e.g., low density polyethylene, medium density polyethylene, high density polyethylene and linear low density polyethylene), polypropylene, polybutene-1 and poly-4-methylpentene-1; a copolymer of ethylene and an α-olefin, such as an ethylene-propylene random copolymer, an ethylene-propylene block copolymer, an ethylene-propylene-polybutene-1 copolymer and an ethylene-cyclic olefin copolymer; an ethylene copolymer, such as an ethylene-α,β-unsaturated carboxylic acid copolymer, e.g., an ethylene-(meth)acrylic acid copolymer, an ethylene-α,β-unsaturated carboxylate ester copolymer, such as an ethylene-ethyl (meth)acrylate copolymer, an ionically crosslinked product of an ethylene-α,β-unsaturated carboxylic acid copolymer, and an ethylene-vinyl acetate copolymer; and a graft-modified polyolefin obtained by graft-modifying these polyolefins with an acid anhydride, such as maleic anhydride.

[Polyester]

In the present invention, the polyester includes ones formed of one kind or two or more kinds selected from a polybasic carboxylic acid including a dicarboxylic acid and an ester forming derivative thereof and one kind or two or more kinds selected from a polyhydric alcohol including a glycol, ones formed of a hydroxycarboxylic acid or an ester forming derivative thereof, and ones formed of a cyclic ester.

Examples of the dicarboxylic acid include a saturated aliphatic dicarboxylic acid or an ester forming derivative thereof, such as oxalic acid, malonic acid, succinic acid, glutaric acid, adipic acid, pimelic acid, suberic acid, azelaic acid, sebacic acid, decanedicarboxylic acid, dodecanedicarboxylic acid, tetradecanedicarboxylic acid, hexadecanedicarboxylic acid, 3-cyclobutanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, 2,5-norbornanedicarboxylic acid and a dimer acid; an unsaturated aliphatic dicarboxylic acid or an ester forming derivative thereof, such as fumaric acid, maleic acid and itaconic acid; an aromatic dicarboxylic acid or an ester forming derivative thereof, such as orthophthalic acid, isophthalic acid, terephthalic acid, 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, 4,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid and anthracenedicarboxylic acid; and a metal sulfonate group-containing aromatic dicarboxylic acid or a lower alkyl ester derivative thereof, such as 5-sodium sulfoisophthalate, 2-sodium sulfoterephthalate, 5-lithium sulfoisophthalate, 2-lithium sulfoterephthalate, 5-potassium sulfoisophthalate and 2-potassium sulfoterephthalate.

Among these, a metal sulfonate group-containing aromatic dicarboxylic acid is excellent in compatibility with the polyamide compound (A) and disperses the polyamide compound (A) finely in the polyester, thereby enhancing the transparency of the injection molded article. The content of the metal sulfonate group is preferably from 0.01 to 5% by mol, more preferably from 0.03 to 2% by mol, and further preferably from 0.06 to 1% by mol, based on the dicarboxylic acid constitutional unit, from the standpoint of enhancing the compatibility without impairing the characteristics of the polyester.

Among these dicarboxylic acids, terephthalic acid, isophthalic acid and naphthalenedicarboxylic acid are preferably used from the standpoint of the physical characteristics of the resulting polyester, and another dicarboxylic acid may be copolymerized therewith depending on necessity.

Examples of the polybasic carboxylic acid other than these dicarboxylic acids include ethanetricarboxylic acid, propanetricarboxylic acid, butanetetracarboxylic acid, pyromellitic acid, trimellitic acid, trimeric acid, 3,4,3',4'-biphenyltetracarboxylic acid, and ester forming derivatives thereof Examples of the glycol include an aliphatic glycol, such as ethylene glycol, 1,2-propylene glycol, 1,3-propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 1,10-decamethylene glycol, 1,12-dodecanediol, polyethylene glycol, polytrimethylene glycol and polytetramethylene glycol, and an aromatic glycol, such as hydroquinone, 4,4'-dihydroxybisphenol, 1,4-bis(β-hydroxyethoxy)benzene, 1,4-bis(β-hydroxyethoxyphenyl)sulfone, bis(p-hydroxyphenyl) ether, bis(p-hydroxyphenyl)sulfone, bis(p-hydroxyphenyl)methane, 1,2-bis(p-hydroxyphenyl)ethane, bisphenol A, bisphenol C, 2,5-naphthalenediol, 2,2,4,4-tetramethyl-1,3-cyclobutanediol and glycols formed by adding ethylene oxide to these glycols.

Among these glycols, ethylene glycol, 1,3-propylene glycol, 1,4-butylene glycol and 1,4-cyclohexanedimethanol are preferably used as a major component.

The injection molded article formed of a resin composition obtained by mixing a polyester containing a 2,2,4,4-tetramethyl-1,3-cyclobutanediol residual group with the polyamide composition (A) is excellent in transparency.

Examples of the polyhydric alcohol other than these glycols include trimethylolmethane, trimethylolethane, trimethylolpropane, pentaerythritol, glycerol and hexanetriol. Examples of the hydroxycarboxylic acid include lactic acid, citric acid, malic acid, tartaric acid, hydroxyacetic acid, 3-hydroxybutyric acid, p-hydroxybenzoic acid, p-(2-hydroxyethoxy)benzoic acid, 4-hydroxycyclohexanecarboxylic acid, and ester forming derivatives thereof Examples of the cyclic ester include ε-caprolactone, β-propiolactone, β-methyl-β-propiolactone, δ-valerolactone, glycolide and lactide.

Examples of the ester forming derivative of the polybasic carboxylic acid and the hydroxycarboxylic acid include an alkyl ester, an acid chloride and an acid anhydride thereof.

The polyester used in the present invention is preferably a polyester containing terephthalic acid or an ester forming derivative thereof or naphthalenedicarboxylic acid or an ester forming derivative thereof as a major acid component, and an alkylene glycol as a major glycol component.

The polyester containing terephthalic acid or an ester forming derivative thereof as a major acid component is preferably a polyester containing terephthalic acid or an ester forming derivative thereof in an amount of 70% by mol or more based on the total acid components, more preferably a polyester containing it in an amount of 80% by mol or more, and further preferably a polyester containing it in an amount of 90% by mol or more. Similarly, the polyester containing naphthalenedicarboxylic acid or an ester forming derivative thereof as a major acid component is preferably a polyester containing naphthalenedicarboxylic acid or an ester forming derivative thereof in an amount of 70% by mol or more based on the total acid components, more preferably a polyester containing it in an amount of 80% by mol or more, and further preferably a polyester containing it in an amount of 90% by mol or more.

The naphthalenedicarboxylic acid or an ester forming derivative thereof used in the present invention is preferably 1,3-naphthalenedicarboxylic acid, 1,4-naphthalenedicarboxylic acid, 1,5-naphthalenedicarboxylic acid, 2,6-naphthalenedicarboxylic acid, 2,7-naphthalenedicarboxylic acid, or an ester forming derivative thereof shown in examples of the dicarboxylic acid described above.

The polyester containing an alkylene glycol as a major glycol component is preferably a polyester containing an alkylene glycol in an amount of 70% by mol or more based on the total glycol components, more preferably a polyester containing it in an amount of 80% by mol or more, and further preferably a polyester containing it in an amount of 90% by mol or more. The alkylene glycol referred herein may contain a substituent and an alicyclic structure in the molecular chain.

The copolymerization component other than terephthalic acid and ethylene glycol is preferably at least one selected from the group consisting of isophthalic acid, 2,6-naphthalenedicarboxylic acid, diethylene glycol, neopentyl glycol, 1,4-cyclohexanedimethanol, 1,2-propanediol, 1,3-propanediol and 2-methyl-1,3-propanediol, for achieving both the transparency and the moldability, and is particularly preferably at least one selected from the group consisting of isophthalic acid, diethylene glycol, neopentyl glycol and 1,4-cyclohexanedimethanol.

Preferred examples of the polyester used in the present invention include a polyester containing ethylene terephthalate as a major repeating unit, more preferably a linear polyester containing an ethylene terephthalate unit in an amount of 70% by mol or more, further preferably a linear polyester containing an ethylene terephthalate unit in an amount of 80% by mol or more, and particularly preferably a linear polyester containing an ethylene terephthalate unit in an amount of 90% by mol or more.

Other preferred examples of the polyester used in the present invention include a polyester containing ethylene 2,6-naphthalate as a major repeating unit, more preferably a linear polyester containing an ethylene 2,6-naphthalate unit in an amount of 70% by mol or more, further preferably a linear polyester containing an ethylene 2,6-naphthalate unit in an amount of 80% by mol or more, and particularly preferably a linear polyester containing an ethylene 2,6-naphthalate unit in an amount of 90% by mol or more.

Other preferred examples of the polyester used in the present invention include a linear polyester containing a propylene terephthalate unit in an amount of 70% by mol or more, a linear polyester containing a propylene naphthalate unit in an amount of 70% by mol or more, a linear polyester containing a 1,4-cyclohexanedimethylene terephthalate unit in an amount of 70% by mol or more, a linear polyester containing a butylene naphthalate unit in an amount of 70% by mol or more, and a linear polyester containing a butylene terephthalate unit in an amount of 70% by mol or more.

In particular, the total composition of the polyester is preferably a combination of terephthalic acid/isophthalic acid//ethylene glycol, a combination of terephthalic acid//ethylene glycol/1,4-cyclohexanedimethanol, and a combination of terephthalic acid//ethylene glycol/neopentyl glycol, for achieving both the transparency and the moldability. The polyester may contain diethylene glycol in a small amount (5% by mol or less) that is formed through dimerization of ethylene glycol during the esterification (ester exchange) reaction and the polycondensation reaction.

Other preferred examples of the polyester used in the present invention include a polyglycolic acid formed by polycondensation of glycolic acid or methyl glycolate, or ring-opening polycondensation of glycolide. The polyglycolic acid may be copolymerized with another component, such as lactide.

The injection molded article may be improved in color and transparency by further mixing a polybasic carboxylic acid compound upon melt-mixing the polyamide compound (A) and the polyester. Examples of the polybasic carboxylic acid compound used include those described for the raw materials for the polyester. Among these, phthalic acid, phthalic anhydride, trimellitic acid and trimellitic anhydride are preferred, phthalic anhydride, trimellitic acid and trimellitic an hydride are more preferred, phthalic anhydride and trimellitic anhydride are further preferred, and trimellitic anhydride is particularly preferred.

The ratio of the polybasic carboxylic acid compound mixed is preferably from 0.05 to 2% by mass, and more preferably from 0.5 to 1% by mass, based on the polyamide compound (A), from the standpoint of the molding processability and the transparency.

[Polyamide]

Examples of the polyamide used in the present invention (the "polyamide" referred herein is the polyamide resin to be mixed with the "polyamide compound (A)" of the present invention, but is not the "polyamide compound (A)" of the present invention itself) include a polyamide containing a unit derived from a lactam or an aminocarboxylic acid as a major constitutional unit, an aliphatic polyamide containing a unit derived from an aliphatic diamine and an aliphatic dicarboxylic acid as a major constitutional unit, a partially aromatic polyamide containing a unit derived from an aliphatic diamine and an aromatic dicarboxylic acid as a major constitutional unit, and a partially aromatic polyamide containing a unit derived from an aromatic diamine and an aliphatic dicarboxylic acid as a major constitutional unit, and a monomer unit other than the major constitutional unit may be copolymerized therewith depending on necessity.

Examples of the lactam or aminocarboxylic acid used include a lactam, such as ε-caprolactam and laurolactam, an aminocarboxylic acid compound, such as aminocaproic acid and aminoundecanoic acid, and an aromatic aminocarboxylic acid, such as p-aminomethylbenzoic acid.

Examples of the aliphatic diamine used include an aliphatic diamine having from 2 to 12 carbon atoms and a functional derivative thereof. An alicyclic diamine may also be used therefor. The aliphatic diamine may be a linear aliphatic diamine or an aliphatic diamine having a branched chain form. Specific examples of the linear aliphatic diamine include an aliphatic diamine, such as ethylenediamine, 1-methylethylenediamine, 1,3-propylenediamine, tetramethylenediamine, pentamethylenediamine, hexamethylenediamine, heptamethylenediamine, octamethylenediamine, nonamethylenediamine, decamethylenediamine, undecamethylenediamine and dodecamethylenediamine. Specific examples of the alicyclic diamine include cyclohexanediamine, 1,3-bis(aminomethyl)cyclohexane and 1,4-bis(aminomethyl)cyclohexane.

The aliphatic dicarboxylic acid is preferably a linear aliphatic dicarboxylic acid or an alicyclic dicarboxylic acid, and particularly preferably a linear aliphatic dicarboxylic acid having an alkylene group having from 4 to 12 carbon atoms. Examples of the linear aliphatic dicarboxylic acid include adipic acid, sebacic acid, malonic acid, succinic acid, glutaric acid, pimelic acid, suberic acid, azelaic acid, undecanoic acid, undecanedioic acid, dodecanedioic acid, a dimer acid, and functional derivatives thereof. Examples of the alicyclic dicarboxylic acid include alicyclic dicarboxylic acids, such as 1,4-cyclohexanedicarboxylic acid, hexahydroterephthalic acid and hexahydroisophthalic acid.

Examples of the aromatic diamine include m-xylylenediamine, p-xylylenediamine and p-bis(2-aminoethyl)benzene.

Examples of the aromatic dicarboxylic acid include terephthalic acid, isophthalic acid, phthalic acid, 2,6-naphthalenedicarboxylic acid, diphenyl-4,4'-dicarboxylic acid, diphenoxyethanedicarboxylic acid, and functional derivatives thereof.

Specific examples of the polyamide include polyamide 4, polyamide 6, polyamide 10, polyamide 11, polyamide 12, polyamide 4,6, polyamide 6,6, polyamide 6,10, polyamide 6T, polyamide 9T, polyamide 6IT, poly-m-xylylene adipamide (polyamide MXD6), isophthalic acid-copolymerized poly-m-xylylene adipamide (polyamide MXD6I), poly-m-xylylene sebacamide (polyamide MXD10), poly-m-xylylene dodecanamide (polyamide MXD12), poly-1,3-bis(aminomethyl)cyclohexane adipamide (polyamide BAC6) and poly-p-xylylene sebacamide (polyamide PXD10). More preferred examples of the polyamide include polyamide 6, polyamide MXD6 and polyamide MXD6I.

The copolymerization component of the polyamide may be a polyether having at least one terminal amino group or terminal carboxyl group having a number average molecular weight of from 2,000 to 20,000, an organic carboxylate salt of the polyether having a terminal amino group, or an amino salt of the polyether having a terminal carboxyl group. Specific examples thereof include bis(aminopropyl)poly(ethyleneoxide) (polyethylene glycol having a number average molecular weight of from 2,000 to 20,000).

The partially aromatic polyamide may contain a constitutional unit derived from a tribasic or higher basic carboxylic acid, such as trimellitic acid and pyromellitic acid, in such a range that the partially aromatic polyamide is substantially linear.

The polyamide may be produced a melt polycondensation method in the presence of water, a melt polycondensation method in the absence of water, or a method of subjecting a polyamide obtained by the melt polycondensation method further to solid phase polymerization, which are basically known in the art. The melt polycondensation reaction may be performed by one step, or may be performed by dividing into plural steps. The reaction may be performed with a batch reaction apparatus or a continuous reaction apparatus. The melt polycondensation step and the solid phase polymerization step may be performed continuously or separately.

[Ethylene-Vinyl Alcohol Copolymer]

The ethylene-vinyl alcohol copolymer used in the present invention is not particularly limited, and preferably has an ethylene content of from 15 to 60% by mol, more preferably from 20 to 55% by mol, and further preferably from 29 to 44% by mol, and preferably has a saponification degree of the vinyl acetate component of 90% by mol or more, and more preferably 95% by mol or more.

The ethylene-vinyl alcohol copolymer may contain a small amount of a comonomer, such as an α-olefin, e.g., propylene, isobutene, α-octene, α-dodecene and α-octadecene, an unsaturated carboxylic acid or a salt, a partial alkyl ester, a complete alkyl ester, a nitrile, an amide or an anhydride thereof, or an unsaturated sulfonic acid or a salt thereof

[Plant-Derived Resin]

Examples of the plant-derived resin include various known aliphatic polyester biodegradable resins derived from other materials than petroleum oils, with no particular limitation, while they partially overlap the aforementioned resins. Examples of the aliphatic polyester biodegradable resin include a poly(α-hydroxy acid), such as polyglycolic acid (PGA) and polylactic acid (PLA); and a polyalkylene alkanoate, such as polybutylene succinate (PBS) and polyethylene succinate (PES).

[Additional Resin]

The resin composition may contain a known resin as the resin (B) depending on the capability to be imparted to the resin composition, in such a range that does not impair the advantages of the present invention. Examples thereof include a polyolefin, such as polyethylene and polypropylene, and modified products thereof, a thermoplastic elastomer, such as a polyolefin elastomer, a polyamide elastomer, a styrene-butadiene copolymer resin and a hydrogenised product thereof, and a polyester elastomer, and a polyamide, such as nylon 6, 66, 12, and nylon 12, from the standpoint of imparting impact resistance, pinhole resistance and flexibility to the oxygen absorbing barrier layer, and also include a carbon-carbon unsaturated double bond-containing resin, such as polybutadiene and modified polybutadiene, from the standpoint of further imparting an oxygen absorbing capability thereto.

1-3. Additive (C)

In the present invention, the resin composition may contain, in addition to the polyamide compound (A) and the resin (B), an additive (C) depending on necessity. The additive (C) may be only one kind or a combination of two or more kinds thereof. The content of the additive (C) in the resin composition is preferably 10% by mass or less, and more preferably 5% by mass or less, while it depends on the kind of the additive.

[Whitening Preventing Agent]

In the present invention, at least one selected from the group consisting of a fatty acid metal salt, a diamide compound and a diester compound is preferably added as a whitening preventing agent to the resin composition for preventing whitening after subjecting to a hydrothermal treatment or after elapse of a prolonged period of time. As described later, the fatty acid metal salt also has a function of an oxidation reaction accelerator, and the reducible organic compound also has a function of an oxygen absorbent.

The number of carbon atoms of the fatty acid metal salt is preferably from 18 to 50, and more preferably from 18 to 34. The fatty acid constituting the fatty acid metal salt may have a side chain and a double bond, but a linear saturated fatty acid, such as stearic acid (C18), eicosanoic acid (C20), behenic acid (C22), montanic acid (C28) and triacontanoic acid (C30), is preferred. The metal that forms the salt with the fatty acid is not particularly limited, examples of which include sodium, potassium, lithium, calcium, barium, magnesium, strontium, aluminum and zinc, and sodium, potassium, lithium, calcium, aluminum and zinc are particularly preferred.

Preferred examples of the diamide compound used in the present invention include a diamide compound obtained with an aliphatic dicarboxylic acid having from 8 to 30 carbon atoms and a diamine having from 2 to 10 carbon atoms. The whitening prevention effect is expected with an aliphatic dicarboxylic acid having 8 or more carbon atoms and a diamine having 2 or more carbon atoms. The diamide compound may be favorably dispersed uniformly in the resin composition with an aliphatic dicarboxylic acid having 30 or less carbon atoms and a diamine having 10 or less carbon atoms. The aliphatic dicarboxylic acid may have a side chain and a double bond, but a linear saturated aliphatic dicarboxylic acid is preferred. The diamide compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30).

Examples of the diamine include ethylenediamine, butylenediamine, hexanediamine, xylylenediamine and bis(aminomethyl)cyclohexane. The diamide compound that is obtained by combining these compounds is preferred.

A diamide compound obtained with an aliphatic dicarboxylic acid having from 8 to 30 carbon atoms and a diamine mainly containing ethylene diamine, and a diamine compound obtained with an aliphatic dicarboxylic acid mainly containing montanic acid and a diamine having from 2 to 10 carbon atoms are preferred, and a diamine compound obtained with an aliphatic dicarboxylic acid mainly containing stearic acid and a diamine mainly containing ethylenediamine is particularly preferred.

Preferred examples of the diester compound used in the present invention include a diester compound obtained with an aliphatic dicarboxylic acid having from 8 to 30 carbon atoms and a diol having from 2 to 10 carbon atoms. The whitening prevention effect is expected with an aliphatic dicarboxylic acid having 8 or more carbon atoms and a diol having 2 or more carbon atoms. The diester compound may be favorably dispersed uniformly in the resin composition with an aliphatic dicarboxylic acid having 30 or less carbon atoms and a diol having 10 or less carbon atoms. The aliphatic dicarboxylic acid may have a side chain and a double bond, but a linear saturated aliphatic dicarboxylic acid is preferred. The diester compound may be used solely with one kind or as a combination of two or more kinds thereof.

Examples of the aliphatic dicarboxylic acid include stearic acid (C18), eicosanoic acid (C20), behenic acid (C22), montanic acid (C28) and triacontanoic acid (C30). Examples of the diol include ethylene glycol, propanediol, butanediol, hexanediol, xylylene glycol and cyclohexanedimethanol. The diester compound that is obtained by combining these compounds is preferred.

A diester compound obtained with an aliphatic dicarboxylic acid mainly containing montanic acid and a diol mainly containing ethylene glycol and/or 1,3-butanediol is particularly preferred.

In the present invention, the total amount of the fatty acid metal salt, the diamide compound and the diester compound added may be from 0.005 to 0.5% by mass, preferably from 0.05 to 0.5% by mass, and particularly preferably from 0.12 to 0.5% by mass, in the resin composition. When these compounds are added in an amount of 0.005% by mass or more in the resin composition, and a crystallization nucleating agent is used in combination, a synergistic effect of whitening prevention may be expected. When the amount is 0.5% by mass or less in the resin composition, a molded article obtained by molding the resin composition may have a clouding point maintained at a low level.

As the reducible organic compound, a photo reducible pigment, such as a quinone compound and an azo compound, and a carbonyl compound having absorption in an UV spectrum may be preferably used. Among these, a quinone compound is particularly preferred. A quinone compound has two carbonyl groups (for example, ketone structures) present on a ring such as a benzene ring, examples of which include a quinone such as benzoquinone, anthraquinone and naphthoquinone, and a derivative of a quinone having added thereto a functional group such as a hydroxyl group, a methyl group, an ethyl group, an amino group and a carboxyl group, and hydrogen may be partially added to the quinones and the derivatives thereof (hereinafter referred to as a benzoquinone compound, an anthraquinone compound and a naphthoquinone compound, respectively). The kind, number and position of the functional group are not particularly limited. The benzoquinone compound, the anthraquinone compound and the naphthoquinone compound may be a dimer, a trimer or the like.

Examples of the benzoquinone compound include 1,2-benzoquinone (o-benzoquinone), 1,4-benzoquinone (p-benzoquinone), 2-chloro-1,4-benzoquinone, 2,3-dichloro-5,6-dicyanobenzoquinone, 2,5-dichloro-3,6-dihydroxy-1,4-benzoquinone, 2,5-dichloro-1,4-benzoquinone, 2,6-dichloro-1,4-benzoquinone, 2,5-dihydroxy-1,4-benzoquinone, 2,6-di-tert-butyl-1,4-benzoquinone, 3,5-di-tert-butyl-1,2-benzoquinone, 2,6-dibromo-N-chloro-1,4-benzoquinoneimine, 2,6-dibromo-N-chloro-1,4-benzoquinonemonoimine, 2,5-dimethyl-1,4-benzoquinone, 2,6-dimethylbenzoquinone, 2,6-dimethoxy-1,4-benzoquinone, tetrachloro-1,4-benzoquinone, tetrachloro-1,2-benzoquinone, tetrahydroxy-1,4-benzoquinone, tetrafluoro-1,4-benzoquinone, N,2,6-trichloro-1,4-benzoquinonemonoimine, trimethyl-1,4-benzoquinone, phenyl-1,4-benzoquinone, 1,4-benzoquinone dioxime and methyl-1,4-benzoquinone, and the benzoquinone compound is not limited to these compounds.

Examples of the anthraquinone compound include anthraquinone, 2-methylanthraquinone, 2-ethylanthraquinone, dihydroxyanthraquinone, trihydroxyanthraquinone, 1,2,3,4-tetrahydroanthraquinone, 1,4,4a,9a-tetrahydroanthraquinone, hexahydroanthraquinone, 1-aminoanthraquinone, 1-amino-4-hydroxyanthraquinone, disodium anthraquinone-2,6-disulfonate, sodium anthraquinone-1-sulfonate, sodium anthraquinone-2-sulfonate monohydrate, 1-chloroanthraquinone, 2-chloroanthraquinone, 1,4-diaminoanthraquinone, 1,5-dichloroanthraquinone, 1,5-dihydroxyanthraquinone, 1,8-dihydroxyanthraquinone, 1,4-dihydroxyanthraquinone, 4,5-dihydroxyanthraquinone-2-carboxylic acid, 1,4-dimethylanthraquinone, 1,2,4-trihydroxyanthraquinone, 2-(hydroxymethyl)anthraquinone and 2-tert-butylanthraquinone, and the anthraquinone compound is not limited to these compounds.

Examples of the naphthoquinone compound include 1,2-naphthoquinone, 1,4-naphthoquinone, 2-hydroxy-1,4-naphthoquinone, 5-hydroxy-1,4-naphthoquinone, 5,8-dihydroxy-1,4-naphthoquinone, 2-methyl-1,4-naphthoquinone, 2,3-dichloro-5,8-dihydroxy-1,4-naphthoquinone, 2,3-dichloro-1,4-naphthoquinone and sodium 1,2-naphthoquinone-4-sulfonate, and the naphthoquinone compound is not limited to these compounds.

The reducible organic compound is preferably selected from the benzoquinone compound, the anthraquinone compound and the naphthoquinone compound. The reducible organic compound is more preferably selected from the benzoquinone compound, the anthraquinone compound and the naphthoquinone compound that are partially hydrogenated. The reducible organic compound is further preferably selected from the benzoquinone compound, the anthraquinone compound and the naphthoquinone compound that have a functional group and are partially hydrogenated. The reducible organic compound is particularly preferably selected from tetrahydroanthraquinone, tetrahydroanthraquinone having a functional group, hexahydroanthraquinone, and hexahydroanthraquinone having a functional group.

The content of the reducible organic compound is preferably from 1 to 10% by mass contained in the resin composition.

[Layered Silicate]

In the present invention, the resin composition may contain a layered silicate. The addition of the layered silicate can impart not only the oxygen barrier property, but also the barrier property to other gases, such as carbon dioxide gas, to the injection molded article.

The layered silicate is a di-octahedral or tri-octahedral layered silicate having a charge density of from 0.25 to 0.6, examples of the di-octahedral one include montmorillonite and beidellite, and examples of the tri-octahedral one include hectorite and saponite. Among these, montmorillonite is preferred.

The layered silicate is preferably made in contact with an organic swelling agent, such as a polymer compound and an organic compound, in advance, thereby expanding the layers of the layered silicate. Preferred examples of the organic swelling agent include a tertiary ammonium salt, and a tertiary ammonium salt having at least one alkyl or alkenyl group having 12 or more carbon atoms is preferably used.

Specific examples of the organic swelling agent include a trimethyl alkyl ammonium salt, such as a trimethyl dodecyl ammonium salt, a trimethyl tetradecyl ammonium salt, a trimethyl hexadecyl ammonium salt, a trimethyl octadecyl ammonium salt and a trimethyl eicosyl ammonium salt; a trimethyl alkenyl ammonium salt, such as a trimethyl octadecenyl ammonium salt and a trimethyl octadecadienyl ammonium salt; a triethyl alkyl ammonium salt, such as a triethyl dodecyl ammonium salt, a triethyl tetradecyl ammonium salt, a triethyl hexadecyl ammonium salt and a triethyl octadecyl ammonium salt; a tributyl alkyl ammonium salt, such as a tributyl dodecyl ammonium salt, a tributyl tetradecyl ammonium salt, a tributyl hexadecyl ammonium salt and a tributyl octadecyl ammonium salt; a dimethyl dialkyl ammonium salt, such as a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt; a dimethyl dialkenyl ammonium salt, such as a dimethyl dioctadecenyl ammonium salt and a dimethyl dioctadecadienyl ammonium salt; a diethyl dialkyl ammonium salt, such as a diethyl didodecyl ammonium salt, a diethyl ditetradecyl ammonium salt, a diethyl dihexadecyl ammonium salt and a diethyl dioctadecyl ammonium salt; a dibutyl dialkyl ammonium salt, such as a dibutyl didodecyl ammonium salt, a dibutyl ditetradecyl ammonium salt, a dibutyl dihexadecyl ammonium salt and a dibutyl dioctadecyl ammonium salt; a methyl benzyl dialkyl ammonium salt, such as a methyl benzyl dihexadecyl ammonium salt; a dibenzyl dialkyl ammonium salt, such as dibenzyl dihexadecyl ammonium salt; a trialkyl methyl ammonium salt, such as a tridecyl methyl ammonium salt, a tritetradecyl methyl ammonium salt and a trioctadecyl methyl ammonium salt; a trialkyl ethyl ammonium salt, such as a tridodecyl ethyl ammonium salt; a trialkyl butyl ammonium salt, such as a tridodecyl butyl ammonium salt; and an ω-amino acid, such as 4-amino-n-butyric acid, 6-amino-n-caproic acid, 8-aminocaprylic acid, 10-aminodecanoic acid, 12-aminododecanoic acid, 14-aminotetradecanoic acid, 16-aminohexadecanoic acid and 18-aminooctadecanoic acid. An ammonium salt containing a hydroxyl group and/or an ether group may also be used as the organic swelling agent, and particularly a tertiary ammonium salt containing at least one alkylene glycol residual group, such as a methyl dialkyl (PAG) ammonium salt, an ethyl dialkyl (PAG) ammonium salt, a butyl dialkyl (PAG) ammonium salt, a dimethyl bis(PAG) ammonium salt, a diethyl bis(PAG) ammonium salt, a dibutyl bis(PAG) ammonium salt, a methyl alkyl bis(PAG) ammonium salt, an ethyl alkyl bis(PAG) ammonium salt, a butyl alkyl bis(PAG) ammonium salt, a methyl tri(PAG) ammonium salt, an ethyl tri(PAG) ammonium salt, a butyl tri(PAG) ammonium salt and a tetra(PAG) ammonium salt (wherein the alkyl means an alkyl group having 12 or more carbon atoms, such as dodecyl, tetradecyl, hexadecyl, octadecyl and eicosyl, and PAG means a polyalkylene glycol residual group, and preferably a polyethylene glycol residual group or a polypropylene glycol residual group each having 20 or less carbon atoms), may also be used as the organic swelling agent. Among these, a trimethyl dodecyl ammonium salt, a trimethyl tetradecyl ammonium salt, a trimethyl hexadecyl ammonium salt, a trimethyl octadecyl ammonium salt, a dimethyl didodecyl ammonium salt, a dimethyl ditetradecyl ammonium salt, a dimethyl dihexadecyl ammonium salt, a dimethyl dioctadecyl ammonium salt and a dimethyl ditallow ammonium salt are preferred. The organic swelling agent may be used solely or as a mixture of plural kinds thereof.

In the present invention, the resin composition containing from 0.5 to 8% by mass of the layered silicate having been treated with the organic swelling agent is preferably used, and the amount of the layered silicate is more preferably from 1 to 6% by mass, and more preferably from 2 to 5% by mass. When the amount of the layered silicate added is 0.5% by mass or more, the improvement in gas barrier property may be sufficiently obtained. When the amount thereof is 8% by mass or less, the resin composition may be prevented from suffering a problem of formation of pinholes due to deterioration of flexibility of the resin composition.

In the resin composition, the layered silicate is preferably dispersed uniformly without local aggregation. The uniform dispersion referred herein means that the layered silicate is separated into flat plates in the resin composition, and 50% or more of the flat plates have an interlayer distance of 5 nm or more. The interlayer distance referred herein means the distance between barycenters of the flat plates. When the distance is larger, a better dispersed state is obtained, which results in improvement of the appearance, such as the transparency, and enhancement of the gas barrier property to oxygen, carbon dioxide and the like.

[Oxidation Reaction Accelerator]

For further enhancing the oxygen absorbing capability of the resin composition, a known oxidation reaction accelerator may be added in such a range that does not impair the advantages of the present invention. The oxidation reaction accelerator can facilitate the oxygen absorbing capability of the polyamide compound (A), thereby enhancing the oxygen absorbing capability of the resin composition. Examples of the oxidation reaction accelerator include an inorganic or organic salt of a metal of Group VIII in the periodic table, such as iron, cobalt and nickel, a metal of Group I, such as copper and silver, a metal of Group IV, such as tin, titanium and zirconium, and a metal with a low valency of Group V, such as vanadium, Group VI, such as chromium, or Group VII, such as manganese, and complex salts of the transition metals. Among these, a cobalt salt and a combination of a cobalt salt and a manganese salt are preferred owing to the excellent oxidation reaction accelerating effect thereof.

In the present invention, the amount of the oxidation reaction accelerator added is preferably from 10 to 800 ppm, more preferably from 50 to 600 ppm, and further preferably from 100 to 400 ppm, in terms of metal atom concentration in the resin composition. The effect of oxidation reaction acceleration depends on the terminal amino group concentration [$NH_2$] of the polyamide compound (A), and the oxidation reaction is accelerated when the terminal amino group concentration [$NH_2$] is lower.

[Oxygen Absorbent]

For further enhancing the oxygen absorbing capability of the resin composition, a known oxygen absorbent may be added in such a range that does not impair the advantages of the present invention. The oxygen absorbent imparts an oxygen absorbing capability to the resin composition separately from the oxygen absorbing capability of the polyamide compound (A), thereby enhancing the oxygen absorbing capability of the resin composition. Examples of the oxygen absorbent include oxidizing organic compounds, such as a compound having a carbon-carbon double bond in the molecule, for example, vitamin C, vitamin E, butadiene and isoprene.

In the present invention, the amount of the oxygen absorbent added is preferably from 0.01 to 5% by mass, more preferably from 0.1 to 4% by mass, and further preferably from 0.5 to 3% by mass, in the resin composition.

[Gelation Preventing and Fish Eye Preventing Agent]

In the present invention, an addition of at least one kind of a carboxylate salt compound selected from sodium acetate, calcium acetate, magnesium acetate, calcium stearate, magnesium stearate, sodium stearate, and derivatives thereof is preferred. Examples of the derivatives herein include a metal 12-hydroxystearate salt, such as calcium 12-hydroxystearate, magnesium 12-hydroxystearate and sodium 12-hydroxystearate. The addition of the carboxylate salt compound prevents gelation of the polyamide compound (A), which occur during the molding process, and suppresses fish eyes in a molded article thereby enhancing the molding processability.

The amount of the carboxylate salt compound added is preferably from 400 to 10,000 ppm, more preferably from 800 to 5,000 ppm, and further preferably from 1,000 to 3,000 ppm, in terms of concentration in the resin composition. When the amount thereof is 400 ppm or more, the polyamide compound (A) is suppressed from suffering thermal degradation, thereby preventing gelation. When the amount is 10,000 ppm or less, the polyamide compound (A) may not cause molding failure and may not suffer coloration or whitening. When the carboxylate salt compound, which is a basic substance, is present in the molten polyamide compound (A), it is expected that the degradation of the polyamide compound (A) caused by heat is delayed, and thereby formation of gel, which is a final denaturation product, is suppressed.

The carboxylate salt compounds mentioned above are excellent in handleability, and among these, a metal stearate salt is preferred since it is inexpensive, has a function of a lubricant, and stabilizes the molding process. The form of the carboxylate salt compound is not particularly limited. The compound in the form of powder with a smaller particle diameter is preferred for dry mixing since it can be uniformly dispersed in the resin composition, and the particle diameter thereof is preferably 0.2 mm or less.

Furthermore, for further effective gelation prevention and fish eye prevention and for prevention of burning, sodium acetate, which has a high metal salt concentration per 1 g, is preferably used. In the case where sodium acetate is used, it may be dry-mixed with the polyamide compound (A) and the resin (B), and then molded, or from the standpoint of handleability, prevention of acetic acid odor and the like, a master batch containing the polyamide compound (A), the resin (B) and sodium acetate is preferably dry-mixed with the polyamide compound (A) and the resin (B), and then molded. Sodium acetate used in the master batch preferably has a particle diameter of 0.2 mm or less, and more preferably 0.1 mm or less, for facilitating uniform dispersion thereof in the resin composition.

[Antioxidant]

In the present invention, an antioxidant is preferably added from the standpoint of controlling the oxygen absorbing capability and suppressing deterioration of the mechanical properties. Examples of the antioxidant include a copper antioxidant, a hindered phenol antioxidant, a hindered amine antioxidant, a phosphorus antioxidant and a thio antioxidant, and among these, a hindered phenol antioxidant and a phosphorus antioxidant are preferred.

Specific examples of the hindered phenol antioxidant include triethylene glycol bis[3-(3-t-butyl-5-methyl-4-hydroxyphenyl) propionate, 4,4'-butylidene bis(3-methyl-6-t-butylphenol), 1,6-hexanediol bis[3-(3,5-di-t-butyl-4-hydroxyphenyl) propionate, 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl) propionate], 2,2-thiodiethylene bis[3-(3,5-di-t-butyl-4-hydroxyphenyl) propionate], octadecyl 3-(3,5-di-t-butyl-4-hydroxyphenyl) propionate, 2,2-thiobis(4-methyl-6-1-butylphenol), N,N'-hexamethylene bis(3,5-di-t-butyl-4-hydroxyhydroxycinnamide), 3,5-di-t-butyl-4-hydroxybenzylphosphonate diethyl ester, 1,3,5-trimethyl-2,4,6-tris(3,5-di-butyl-4-hydroxybenzyl)benzene, ethyl calcium bis(3,5-di-t-butyl-4-hydroxybenzylsulfonate, tris(3,5-di-t-butyl-4-hydroxybenzyl) isocyanurate, 2,6-di-t-butyl-p-cresol, butylated hydroxyanisole, 2,6-di-t-butyl-4-ethylphenol, stearyl β-(3,5-di-t-butyl-4-hydroxyphenyl) propionate, 2,2'-methylene bis(4-methyl-6-t-butylphenol), 2,2'-methylene bis(4-ethyl-6-t-butylphenol), 4,4'-thiobis(3-methyl-6-t-butylphenol), octylated diphenylamine, 2,4-bis [(octylthio)methyl]-O-cresol, isooctyl-3-(3,5-di-t-butyl-4-hydroxyphenyl) propionate, 4,4'-butylidene bis(3-methyl-6-t-butylphenol, 3,9-bis[1,1-dimethyl-2-[β-(3-t-butyl-4-hydroxy-5-methylphenyl)propionyloxy]ethyl]-2,4,8,10-tetraoxaspiro[5.5]undecane, 1,1,3-tris(2-methyl-4-hydroxy-5-t-butylphenyl)butane, 1,3,5-trimethyl-2,4,6-tris(3,5-di-t-butyl-4-hydroxybenzyl)benzene, bis[3,3'-bis(4'-hydroxy-3'-t-butylphenyl)butyric acid]glycol ester, 1,3,5-tris(3',5'-di-t-butyl-4'-hydroxybenzyl)-sec-triazin-2,4,6-(1H,3H,5H) trione and d-α-tocopherol. These compounds may be used solely or as a mixture thereof. Specific examples of the commercially available product of the hindered phenol compound include Irganox 1010 and Irganox 1098 (both trade names), produced by BASF AG.

Specific examples of the phosphorus antioxidant include organic phosphorus compounds, such as triphenyl phosphite, trioctadecyl phosphite, tridecyl phosphite, trinonylphenyl phosphite, diphenylisodecyl phosphite, bis(2,6-di-tert-butyl-4-methylphenyl)pentaerythritol diphosphite, bis (2,4-di-tert-butylphenyl)pentaerythritol diphosphite, tris(2,4-di-tert-butylphenyl) phosphite, distearyl pentaerythritol diphosphite, tetra(tridecyl-4,4'-isopropylidenediphenyl diphosphite and 2,2-methylene bis(4,6-di-tert-butylphenyl) octyl phosphite. These compounds may be used solely or as a mixture thereof.

The content of the antioxidant in the polyamide composition is not particularly limited in such a range that does not impair the capabilities of the composition, and is preferably from 0.001 to 3% by mass, and more preferably from 0.01 to 1% by mass, in the resin composition, from the standpoint of controlling the oxygen absorbing capability and suppressing deterioration of the mechanical properties.

[Other Additives]

The resin composition may contain additives, such as a lubricant, a matting agent, a heat resistant stabilizer, a weather resistant stabilizer, an ultraviolet ray absorbent, a plasticizer, a flame retardant, an antistatic agent, a coloration preventing agent and a crystallization nucleating agent. The additives may be contained depending on necessity in such a range that does not impair the advantages of the present invention.

For example, the use of an additive, such as an organic phosphorus compound, an organic calcium salt compound, an organic sulfur compound and a triazine compound, is effective for the heat resistance, the transparency, the mechanical characteristics and the molding processability with the lapse of time. In the case where polyester is used as the resin (B), it is also effective for reduction of acetaldehyde. For example, furthermore, in the case where polyester is used as the resin (B), the addition of a primary amino group-containing compound is effective for reduction of acetaldehyde.

3. Injection Molded Article and Production Method Thereof

The production method of the injection molded article of the present invention is not particularly limited, and the injection molded article may be produced by an ordinary injection molding method. For example, by using a molding machine equipped with an injection device, and an injection mold, the resin composition may be injected from the injection cylinder into the cavity through the hot runners of the mold, thereby producing the injection molded article according to the shape of the injection mold.

The mouth and neck portion of the resulting molded article may be crystallized in this stage through a heat treatment for imparting heat resistance to the mouth and neck portion. The crystallization degree is preferably from 30 to 50%, and more preferably from 35 to 45%. The crystallization may be performed after the secondary processing described later.

In the case where the injection molded article of the present invention is a container, oxygen inside the container is absorbed as well as oxygen slightly penetrating from the outside of the container, thereby preventing the content to be stored from being degraded with oxygen.

The shape of the injection molded article of the present invention is not particularly limited and may be in an arbitrary form depending on the mold. In consideration of the fact that the injection molded article of the present invention exhibits the oxygen barrier capability and the oxygen absorbing capability, the injection molded article of the present invention is preferably a storing container, such as a cup container (injection cup) and a bottle container. The injection molded article of the present invention is also preferably a preform in the form of a test tube (parison) for the secondary processing, such as blow molding, described later for a PET bottle or the like.

<<Container Obtained by Processing Injection Molded Article>>

The container obtained by secondarily processing the injection molded article of the present invention absorbs oxygen inside the container as well as oxygen slightly penetrating from the outside of the container, thereby preventing the content to be stored from being degraded with oxygen.

Examples of the secondary processing include blow molding and stretching blow molding, and examples of the container obtained by the secondary processing include a bottle.

In the injection blow molding, a preform in the form of a test tube (parison) is molded as the injection molded article of the present invention, then the mouth portion of the heated preform is fixed to a jig, the preform is set in a mold with a final shape, and the preform is blown and closely attached to the mold by blowing air from the mouth portion, followed by cooling and solidifying, thereby molding into the form of a bottle.

In the injection stretching blow molding, the mouth portion of the heated preform is fixed to a jig, the preform is set in a mold with a final shape, and the preform is blown and closely attached to the mold by blowing air from the mouth portion while stretching with a stretching rod at the mouth portion, followed by cooling and solidifying, thereby molding into the form of a bottle.

The injection stretching blow molding method is roughly classified into a hot parison method and a cold parison method. In the former method, the preform is not completely cooled, but is subjected to blow molding in the softened state. In the latter cold parison method, on the other hand, the preform is molded as a supercooled preform with a bottom, in which the resin is in an amorphous state, having a dimension that is certainly smaller than the final shape, and the preform is preliminarily heated to the stretching temperature thereof, and then blow stretched into the circumferential direction while stretching in the axial direction, inside the mold with a final shape. The cold parison method is suitable for mass production. In both the methods, the preform is heated to the stretching temperature, which is higher than the glass transition point (Tg), and then the preform is stretched in the longitudinal direction with a stretching rod and stretched in the transversal direction by blowing air according to the stretching blow molding method inside the mold with a final shape heated to a heat treatment (heat set) temperature. The stretching ratio of the final blow molded article is preferably from 1.2 to 6 times in the longitudinal direction and from 1.2 to 4.5 times in the transversal direction.

The mold with a final shape is heated to the temperature, at which the crystallization of the resin is accelerated, for example, from 120 to 230° C., preferably from 130 to 210° C., and upon blowing, the outer surface of the container wall of the molded article is made in contact with the inner surface of the mold for a prescribed period of time, thereby performing the heat treatment. After performing the heat treatment for a prescribed period of time, the blowing fluid is switched to an internal cooling fluid, thereby cooling the inner layer. The heat treating time is generally from 1.5 to 30 seconds, and particularly from 2 to 20 seconds, although it changes depending on the thickness and the temperature of the blow molded article. The cooling time is generally from 0.1 to 30 seconds, and particularly from 0.2 to 20 seconds, although it changes depending on the heat treating temperature and the kind of the cooling fluid. The each part of the molded article is crystallized through the heat treatment.

Examples of the cooling fluid used include air at ordinary temperature and various kinds of cooled gas, for example, nitrogen, air and carbon dioxide gas at −40° C. to +10° C., and chemically inert liquefied gas, such as liquefied nitrogen gas, liquefied carbon dioxide gas, liquefied trichlorofluoromethane gas, liquefied dichlorodifluoromethane gas, and other liquefied aliphatic hydrocarbon gas. Liquid mist with large vaporization heat, such as water, may be present in the cooling fluid. By using the cooling fluid described above, a considerably large cooling temperature may be obtained. In the stretching blow molding, two molds may be used, in which the heat treatment may be performed within the prescribed ranges of temperature and period of time in the first mold, and then the blow molded article is transferred to the second Mold for performing blowing the blow molded article again and simultaneously cooling the same. The blow molded article taken out from the mold is cooled by being allowed to cool or by blowing cold air thereto.

As another production method of the blow molded article, two-stage blow molding may be employed, in which the preform is molded with a primary stretching blow mold into a primary blow molded article having a larger dimension than the final blow molded article, and subsequently, the primary blow molded article is shrunk under heating, and then subjected to stretching blow molding with a secondary mold, thereby providing the final blow molded article. According to this production method of the blow molded article, the bottom portion of the blow molded article is sufficiently stretched and thinned, thereby providing a blow molded article excellent in hot charging, deformation of the bottom portion upon heat sterilization, and impact resistance.

The injection molded article and the container obtained by secondarily processing the same of the present invention may have, coated thereon, a vapor deposition film of an inorganic material or an inorganic oxide, and an amorphous carbon film.

Examples of the inorganic material and the inorganic oxide include aluminum, alumina and silicon oxide. The vapor deposition film of an inorganic material or an inorganic oxide may block eluted substances, such as acetaldehyde and formaldehyde, from the injection molded article and the container obtained by secondarily processing the same of the present invention. The formation method of the vapor deposition film is not particularly limited, and examples thereof include a physical vapor deposition method, such as a vacuum vapor deposition method, a sputtering method and an ion plating method, and a chemical vapor deposition method, such as PECVD. The thickness of the vapor deposition film is preferably from 5 to 500 nm, and more preferably from 5 to 200 nm, from the standpoint of the gas barrier property, the light shielding property and the flexural resistance.

The amorphous carbon film is a diamond-like carbon film, and is a hard carbon film, which may be referred to as an i-carbon film or a hydrogenated amorphous carbon film. Examples of the formation method of the film include a method, in which an interior of a hollow molded article is evacuated to make vacuum, to which a carbon source gas is fed, and energy for forming plasma is fed thereto to make plasma of the carbon source gas. According to the method, the amorphous carbon film can be formed on the inner surface of the container. The amorphous carbon film not only considerably decreases the permeability to low molecular weight inorganic gas, such as oxygen and carbon dioxide, but also suppresses sorption of various low molecular weight organic compounds having odor. The thickness of the amorphous carbon film is preferably from 50 to 5,000 nm from the standpoint of the sorption suppressing effect to low molecular weight organic compounds, the enhancing effect of the gas barrier property, the adhesion to plastics, the durability, the transparency and the like.

The injection molded article and the container obtained by secondarily processing the same of the present invention are excellent in oxygen absorbing capability and oxygen barrier property, and are also excellent in flavor retaining property for contents thereof, and thus the injection molded article and the container are suitable for packaging various articles.

Examples of the articles to be stored include various articles, for example, beverages, such as milk, milk products, juice, coffee, tea beverages and alcohol beverages; liquid seasonings, such as Worcester sauce, soy sauce and dressing; cooked foods, such as soup, stew, curry, infant cooked foods and nursing care cooked foods; paste foods, such as jam and mayonnaise; processed seafood, such as tuna and other seafood; processed milk products, such as cheese and butter; processed meat products, such as dressed meat, salami, sausage and ham; vegetables, such as carrot and potato; egg; noodles; processed rice products, such as uncooked rice, cooked rice and rice porridge; dry foods, such as powder seasonings, powder coffee, infant powder milk, powder diet foods, dried vegetables and rice crackers; chemicals, such as agrichemicals and insecticides; medical drugs; cosmetics; pet foods; and sundry articles, such as shampoo, conditioner and cleanser.

The injection molded article and the container are particularly suitable as a packaging material for contents that are liable to be degraded in the presence of oxygen, for example, beverages including beer, wine, fruit juice, carbonated beverages and the like, foods including fruits, nuts, vegetables, meat products, infant foods, coffee, jam, mayonnaise, ketchup, food oil, dressing, sauce, soy sauce boiled foods, dairy products and the like, and other products including medical drugs, cosmetics and the like.

Furthermore, before or after charging the article to be stored, the injection molded article and the container obtained by secondarily processing the same of the present invention and the article to be stored may be subjected to sterilization in the form suitable for the article to be stored. Examples of the sterilization method include heat sterilization, such as a hydrothermal treatment at 100° C. or lower, a pressurized hydrothermal treatment at 100° C. or higher, and an ultrahigh temperature heat treatment at 130° C. or higher; electromagnetic wave sterilization, such as an ultraviolet ray, a microwave and a gamma wave; a gas treatment, such as ethylene oxide gas; and chemical sterilization, such as hydrogen peroxide and hypochlorous acid.

EXAMPLES

The present invention will be described in more detail with reference to examples below, but the present invention is not limited to the examples.

In the following examples, with respect to the units constituting the copolymers, a unit derived from m-xylylenediamine is referred to as "MXDA", a unit derived from 1,3-bis(aminomethyl)cyclohexane is referred to as "1,3BAC", a unit derived from hexamethylenediamine is referred to as "HMDA", a unit derived from adipic acid is referred to as "AA", a unit derived from isophthalic acid is referred to as "IPA", a unit derived from DL-alanine is referred to as "DL-Ala", a unit derived from DL-leucine is referred to as "DL-Leu", and a unit derived from $\epsilon$-caprolactam is referred to as "$\epsilon$-CL".

Further, poly-m-xylylene adipamide is referred to as "N-MXD6".

The polyamide compounds obtained in Production Examples were measured for the α-amino acid content, the relative viscosity, the terminal amino group concentration, the glass transition temperature and the melting point in the following manners. Films were produced with the polyamide compounds obtained in Production Examples and were measured for the oxygen absorbing amount in the following manner.

(1) α-Amino Acid Content

The α-amino acid content of the polyamide compound was quantitatively determined with $^1$H-NMR (400 MHz, JNM-AL400, a trade name, produced by JEOL, Ltd., measurement mode: NON($^1$H)). Specifically, a 5% by mass solution of the polyamide compound was prepared with formic acid-d as a solvent, and subjected to the $^1$H-NMR measurement.

(2) Relative Viscosity 1 g of the polyamide compound was precisely weighed and dissolved in 100 mL of 96% sulfuric acid at 20 to 30° C. under stirring. After completely dissolved, 5 mL of the solution was quickly placed in a Cannon-Fenske viscometer, which was then allowed to stand in a thermostat chamber at 25° C. for 10 minutes, and then the fall time (t) was measured. The fall time ($t_0$) of 96% sulfuric acid was measured in the same manner. The relative viscosity was calculated from t and $t_0$ according to the following expression.

$$\text{Relative viscosity} = t/t_0$$

(3) Terminal Amino Group Concentration [$NH_2$]

The polyamide compound was precisely weighed and dissolved in a solution of phenol/ethanol=4/1 by volume at 20 to 30° C. under stirring. After completely dissolved, under stirring, the inner wall of the container was washed out with 5 mL of methanol, and the solution was subjected to neutralization titration with a 0.01 mol/L hydrochloric acid aqueous solution, thereby measuring the terminal amino group concentration [$NH_2$].

(4) Glass Transition Temperature and Melting Point

DSC measurement (differential scanning calorimeter measurement) was performed with a differential scanning calorimeter (DSC-60, a trade name, produced by Shimadzu Corporation) at a temperature increasing rate of 10° C./min under a nitrogen stream, thereby measuring the glass transition temperature (Tg) and the melting point (Tm).

(5) Oxygen Absorbing Amount

The polyamide compound was molded into a non-stretched single layer film having a thickness of approximately 100 μm with a twin screw extruder having a diameter of 30 mm equipped with a T-die (produced by PLABOR Research Laboratory of Plastics Technology Co., Ltd.) at a cylinder and T-die temperature of (melting point of polyamide compound+20° C.).

Two sheets of specimens having a dimension of 10 cm×10 cm cut out from the non-stretched single layer film thus produced were charged in a bag formed of an aluminum laminated film sealed on three edges thereof having a dimension of 25 cm×18 cm along with cotton impregnated with 10 mL of water, and the bag was sealed to make an air amount inside the bag of 400 mL. The humidity in the bag was 100% RH (relative humidity). After storing at 40° C. for 7 days, 14 days and 28 days, the oxygen concentrations inside the bag each were measured with an oxygen concentration meter (LC-700F, a trade name, produced by Toray Engineering Co., Ltd.), and the oxygen absorbing amount was calculated from the oxygen concentration.

For the polyamide compounds obtained in Production Examples 11 to 15, 2 g of a powder specimen, which was obtained by finely pulverizing the pellet-shaped or pulverized polyamide compound with a pulverizer, packed in chartula was used instead of the film specimen, and the oxygen absorbing amount was calculated in the same manner as above.

Production Example 1 (Production of Polyamide Compound 1)

In a pressure-resistant reaction vessel having an inner capacity of 50 L, equipped with a stirrer, a partial condenser, a total condenser, a pressure regulator, a thermometer, a dropping vessel, a pump, an aspirator, a nitrogen introducing tube, a flash valve and a strand die, 13,000 g (88.96 mol) of precisely weighed adipic acid (produced by Asahi Kasei Chemicals Corporation), 880.56 g (9.88 mol) of DL-alanine (produced by Musashino Chemical Laboratory, Ltd.), 11.7 g (0.11 mol) of sodium hypophosphite and 6.06 g (0.074 mol) of sodium acetate were placed, and after sufficiently replacing with nitrogen, the reaction vessel was sealed, and the system was heated to 170° C. under stirring while maintaining the inside of the vessel to 0.4 MPa. After reaching 170° C., 12,082.2 g (88.71 mol) of m-xylylenediamine (produced by Mitsubishi Gas Chemical Co., Inc.) stored in the dropping vessel was added dropwise to the molten raw materials in the reaction vessel, and the inside of the reaction vessel was continuously heated to 240° C. while maintaining the inside of the vessel to 0.4 MPa and removing condensation water formed. After completing the dropwise addition of m-xylylenediamine, the inside of the reaction vessel was gradually returned to the atmospheric pressure, and then the inside of the reaction vessel was depressurized with the aspirator to 80 kPa for removing condensation water. The stirring torque of the stirrer was observed during the depressurization. At the time when the torque reached a prescribed value, the stirring was stopped, the inside of the reaction vessel was pressurized with nitrogen, the flash valve was opened, and the polyamide compound was taken out from the strand die for obtaining strands. The pellets were charged in a stainless steel rotation drum heating apparatus, which was rotated at 5 rpm. After sufficiently substituting with nitrogen, and the inside of the reaction system was heated from room temperature to 140° C. under a small amount of a nitrogen stream. At the time when the temperature inside the reaction system reached 140° C., the system was depressurized to 1 torr or less, and the temperature inside the system was increased to 180° C. over 110 minutes. From the time when the temperature inside the system reached 180° C., the solid phase polymerization reaction was continued at that temperature for 180 minutes. After completing the reaction, depressurization was terminated, the temperature inside the system was decreased under a nitrogen stream, and at the time when the temperature reached 60° C., the pellets were taken out, thereby providing an MXDA/AA/DL-Ala copolymer (polyamide compound 1). The charged composition of the monomers was m-xylylenediamine/adipic acid/DL-alanine=47.3/47.4/5.3 (% by mol).

Production Example 2 (Production of Polyamide Compound 2)

An MXDA/AA/DL-Ala copolymer (polyamide compound 2) was obtained in the same manner as in Production Example 1 except that the charged composition of the monomers was changed to m-xylylenediamine/adipic acid/DL-alanine=44.4/44.5/11.1 (% by mol).

Production Example 3 (Production of Polyamide Compound 3)

An MXDA/AA/DL-Ala copolymer (polyamide compound 3) was obtained in the same manner as in Production Example 1 except that the charged composition of the monomers was changed to m-xylylenediamine/adipic acid/DL-alanine=41.1/41.3/17.6 (% by mol).

Production Example 4 (Production of Polyamide Compound 4)

An MXDA/AA/DL-Ala copolymer (polyamide compound 4) was obtained in the same manner as in Production Example 1 except that the charged composition of the monomers was changed to m-xylylenediamine/adipic acid/DL-alanine=33.3/33.4/33.3 (% by mol).

Production Example 5 (Production of Polyamide Compound 5)

An MXDA/AA/DL-Leu copolymer (polyamide compound 5) was obtained in the same manner as in Production Example 1 except that the α-amino acid was changed to DL-leucine (produced by Ningbo Haishuo Bio-technology Co., Ltd.), and the charged composition of the monomers was changed to m-xylylenediamine/adipic acid/DL-leucine=44.3/44.6/11.1 (% by mol).

Production Example 6 (Production of Polyamide Compound 6)

An MXDA/AA/IPA/DL-Ala copolymer (polyamide compound 6) was obtained in the same manner as in Production Example 1 except that the dicarboxylic acid component was changed to a mixture of isophthalic acid (produced by A.G. International Chemical Co., Inc.) and adipic acid, and the charged composition of the monomers was changed to m-xylylenediamine/adipic acid/isophthalic acid/DL-alanine=44.3/39.0/5.6/11.1 (% by mol).

Production Example 7 (Production of Polyamide Compound 7)

An MXDA/AA/DL-Leu/ε-CL copolymer (polyamide compound 7) was obtained in the same manner as in Production Example 1 except that ε-caprolactam (produced by Ube Industries, Ltd.) was used as a comonomer, the α-amino acid was changed to DL-leucine, and the charged composition of the monomers was changed to m-xylylenediamine/adipic acid/DL-leucine/ε-caprolactam=41.0/41.3/11.8/5.9 (% by mol).

Production Example 8 (Production of Polyamide Compound 8)

An MXDA/1,3BAC/AA/DL-Ala copolymer (polyamide compound 8) was obtained in the same manner as in Production Example 1 except that the diamine component was changed to a mixture of 1,3-bis(aminomethyl)cyclohexane (produced by Mitsubishi Gas Chemical Co., Inc.) and m-xylylenediamine, and the charged composition of the monomers was changed to m-xylylenediamine/1,3-bis(aminomethyl)cyclohexane/adipic acid/DL-alanine=33.2/11.1/44.6/11.1 (% by mol).

Production Example 9 (Production of Polyamide Compound 9)

An MXDA/HMDA/AA/DL-Ala copolymer (polyamide compound 9) was obtained in the same manner as in Production Example 1 except that the diamine component was changed to a mixture of hexamethylenediamine (produced by Showa Chemical Industry Co., Ltd.) and m-xylylenediamine, and the charged composition of the monomers was changed to m-xylylenediamine/hexamethylenediamine/adipic acid/DL-alanine=33.3/11.1/44.5/11.1 (% by mol).

Production Example 10 (Production of Polyamide Compound 10)

N-MXD6 (polyamide compound 10) was obtained in the same manner as in Production Example 1 except that DL-alanine was not added, and the charged composition of the monomers was changed to m-xylylenediamine/adipic acid=49.8/50.2 (% by mol).

Production Example 11 (Production of Polyamide Compound 11)

An MXDA/AA/DL-Ala copolymer (polyamide compound 11) was obtained in the same manner as in Production Example 1 except that the solid phase polymerization was not performed.

Production Example 12 (Production of Polyamide Compound 12)

An MXDA/AA/DL-Ala copolymer (polyamide compound 12) was obtained in the same manner as in Production Example 2 except that the solid phase polymerization was not performed.

Production Example 13 (Production of Polyamide Compound 13)

An MXDA/AA/DL-Ala copolymer (polyamide compound 13) was obtained in the same manner as in Production Example 4 except that the solid phase polymerization was not performed.

Production Example 14 (Production of Polyamide Compound 14)

An MXDA/AA/IPA/DL-Ala copolymer (polyamide compound 14) was obtained in the same manner as in Production Example 6 except that the solid phase polymerization was not performed.

Production Example 15 (Production of Polyamide Compound 15)

N-MXD6 (polyamide compound 15) was obtained in the same manner as in Production Example 10 except that the solid phase polymerization was not performed.

Table 1 shows the charged monomer composition of the polyamide compounds 1 to 15, and the measurement results of the α-amino acid content, the relative viscosity, the terminal amino group concentration, the glass transition temperature, the melting point and the oxygen absorbing amount of the resulting polyamide compounds.

TABLE 1

|  |  |  | Unit | Production Example 1 | Production Example 2 | Production Example 3 | Production Example 4 | Production Example 5 | Production Example 6 | Production Example 7 | Production Example 8 |
|---|---|---|---|---|---|---|---|---|---|---|---|
|  |  |  |  | Polyamide No. |  |  |  |  |  |  |  |
|  |  |  |  | 1 | 2 | 3 | 4 | 5 | 6 | 7 | 8 |
| Charged monomer composition | aromatic diamine | m-xylylenediamine | mol % | 47.3 | 44.4 | 41.1 | 33.3 | 44.3 | 44.3 | 41.0 | 33.2 |
|  | alicyclic diamine | 1,3-bis(aminomethyl)-cyclohexane | mol % |  |  |  |  |  |  |  | 11.1 |
|  | aliphatic diamine | Hexamethylene-diamine | mol % |  |  |  |  |  |  |  |  |
|  | aliphatic dicarboxylic acid | adipic acid | mol % | 47.4 | 44.5 | 41.3 | 33.4 | 44.6 | 39.0 | 41.3 | 44.6 |
|  | aromatic dicarboxylic acid | isophthalic acid | mol % |  |  |  |  |  | 5.6 |  |  |
|  | α-amino acid | DL-alanine | mol % | 5.3 | 11.1 | 17.6 | 33.3 |  | 11.1 |  | 11.1 |
|  |  | DL-leucine | mol % |  |  |  |  | 11.1 |  | 11.8 |  |
|  | aminocarboxylic acid | ε-caprolactam | mol % |  |  |  |  |  |  | 5.9 |  |
|  | α-amino acid content |  | mol % | 5.3 | 11.0 | 17.6 | 33.1 | 11.1 | 11.1 | 11.7 | 11.0 |
| Properties | relative viscosity |  |  | 2.4 | 2.3 | 2.1 | 2 | 2.3 | 2.2 | 2.3 | 2.1 |
|  | terminal group concentration | [NH$_2$] | μeq/g | 42 | 48 | 55 | 68 | 28 | 43 | 25 | 45 |
|  | thermal properties | glass transition temperature Tg | °C. | 86 | 84 | 83 | 81 | 84 | 90 | 80 | 90 |
|  |  | melting point Tm | °C. | 231 | 208 | N.D. | N.D. | 209 | N.D. | 223 | N.D. |
|  | oxygen absorbing amount | after storing 7 days | cc/g | 7 | 9 | 9 | 10 | 7 | 5 | 4 | 7 |
|  |  | after storing 14 days | cc/g | 15 | 18 | 19 | 21 | 14 | 11 | 8 | 16 |
|  |  | after storing 28 days | cc/g | 26 | 30 | 32 | 35 | 24 | 18 | 13 | 28 |

|  |  |  | Unit | Production Example 9 | Production Example 10 | Production Example 11 | Production Example 12 | Production Example 13 | Production Example 14 | Production Example 15 |
|---|---|---|---|---|---|---|---|---|---|---|
|  |  |  |  | Polyamide No. |  |  |  |  |  |  |
|  |  |  |  | 9 | 10 | 11 | 12 | 13 | 14 | 15 |
| Charged monomer composition | aromatic diamine | m-xylylenediamine | mol % | 33.3 | 49.8 | 47.3 | 44.4 | 33.3 | 44.3 | 49.8 |
|  | alicyclic diamine | 1,3-bis(aminomethyl)-cyclohexane | mol % |  |  |  |  |  |  |  |
|  | aliphatic diamine | hexamethylene-diamine | mol % | 11.1 |  |  |  |  |  |  |
|  | aliphatic dicarboxylic acid | adipic acid | mol % | 44.5 | 50.2 | 47.4 | 44.5 | 33.4 | 39.0 | 50.2 |
|  | aromatic dicarboxylic acid | isophthalic acid | mol % |  |  |  |  |  | 5.6 |  |
|  | α-amino acid | DL-alanine | mol % | 11.1 |  | 5.3 | 11.1 | 33.3 | 11.1 |  |
|  |  | DL-leucine | mol % |  |  |  |  |  |  |  |
|  | aminocarboxylic acid | ε-caprolactam | mol % |  |  |  |  |  |  |  |
|  | α-amino acid content |  | mol % | 11.0 | 0.0 | 5.3 | 11.0 | 33.1 | 11.1 | 0.0 |

TABLE 1-continued

| Properties | | | | | | | | | |
|---|---|---|---|---|---|---|---|---|---|
| | relative viscosity | | | 2.2 | 2.4 | 1.7 | 1.7 | 1.6 | 1.7 | 1.7 |
| | terminal group concentration | [NH$_2$] | μeq/g | 49 | 16 | 83 | 85 | 105 | 82 | 84 |
| | thermal properties | glass transition temperature Tg | °C. | 76 | 87 | 86 | 84 | 81 | 90 | 87 |
| | | melting point Tm | °C. | N.D. | 239 | 231 | 208 | N.D. | N.D. | 239 |
| | oxygen absorbing amount | after storing 7 days | cc/g | 8 | 0 | 7 | 8 | 10 | 5 | 0 |
| | | after storing 14 days | cc/g | 15 | 0 | 15 | 16 | 20 | 10 | 0 |
| | | after storing 28 days | cc/g | 24 | 0 | 25 | 28 | 34 | 17 | 0 |

N.D.: not detected

In Examples 1 to 61 and Comparative Examples 1 to 42, injection molded articles and bottles obtained by processing the same were produced by using the polyamide compounds 1 to 15.

The oxygen transmission rate of the bottle or cups obtained in Examples and Comparative Examples, and the strength and the odor in head space upon opening of the bottles or cups were measured and evaluated in the following manners.

(1) Oxygen Transmission Rate (OTR) of Bottle or Cup

The bottles or cups after 1 day, 7 days, 15 days and 30 days from molding were measured for oxygen transmission rate in accordance with ASTM D3985 in an atmosphere at 23° C., a relative humidity outside the molded article of 50% and a relative humidity inside the same of 100%. For the measurement, an oxygen permeability measuring apparatus (Model OX-TRAN 2-61, produced by Mocon, Inc.) was used. A lower measured value means better oxygen barrier property.

(2) Strength of Bottle or Cup

Examples 1 to 40 and Comparative Examples 1 to 24

The bottle was filled with 350 mL of distilled water as a content and sealed, and after storing at 25° C. for 3 months, the content was removed, and the bottle was applied with a vertical load of 350 N. Thereafter, the bottle was measured as to whether or not the original shape of the bottle was restored upon removing the pressure load.

Examples 41 to 61 and Comparative Examples 25 to 42

The cup was filled with 280 mL of distilled water as a content and sealed, and after storing at 25° C. for 3 months, the content was removed, and the cup was applied with a vertical load of 150 N. Thereafter, the cup was measured as to whether or not the original shape of the cup was restored upon removing the pressure load.

A: The original shape of the bottle or cup was restored upon removing the pressure load.

B: The bottle or cup remained deformed upon removing the pressure load.

(3) Odor in Head Space Upon Opening

Examples 1 to 40 and Comparative Examples 1 to 24

The bottle was filled with 350 mL of distilled water as a content and sealed, and after storing at 25° C. for 1 month, the odor in the head space upon opening was sensorily evaluated.

Examples 41 to 61 and Comparative Examples 25 to 42

The cup was filled with 280 mL of distilled water as a content and sealed with an aluminum foil, and after storing at 25° C. for 1 month, the odor in the head space upon opening was sensorily evaluated.

In the evaluation method, the presence of offensive odor was evaluated by observing the odor inside the container immediately after opening by five panelists.

A: Completely no offensive odor was observed.

B: Offensive odor was observed even if only slightly.

[Parison and Biaxially Stretched Blow Molded Bottle]

Example 1

Under the following conditions, a resin composition obtained by mixing the polyamide compound (A) and the resin (B) was injected from the injection cylinder in the necessary amount to fill the cavity, thereby providing an injection molded article (parison) (22.5 g). The resin (B) used was polyethylene terephthalate (BK-2180, a trade name, produced by Japan Unipet Co., Ltd.) having an intrinsic viscosity of 0.83 (measured with a mixed solvent of phenol/tetrachloroethane=6/4 (mass ratio), measurement temperature: 30° C.). The polyamide compound (A) used was the polyamide compound 1 produced in Production Example 1. The ratio of the polyamide compound (A) mixed was 5% by mass.

After cooling the resulting parison, as the secondary processing, the parison was heated and subjected to biaxially stretching blow molding, thereby producing a bottle.

(Shape of Parison)

The parison had a total length of 95 mm, an outer diameter of 22 mm and a thickness of 2.7 mm. The parison was produced by using an injection molding machine (Model M200, produced by Meiki Co., Ltd., four-cavity model).

(Molding Conditions of Parison)
Injection cylinder temperature: 280° C.
Mold resin flow path temperature: 280° C.
Mold cooling water temperature: 15° C.
(Shape of Bottle Obtained by Secondary Processing)

The bottle had a total length of 160 mm, an outer diameter of 60 mm, an inner capacity of 370 mL and a thickness of 0.28 mm. The stretching ratio was 1.9 times for the longitudinal direction and 2.7 times for the transversal direction. The bottom shape was a champagne type bottom. The bottle had dimples on the body. The secondary processing was performed by using a blow molding machine (Model EFB1000ET, produced by Frontier, Inc.).
(Secondary Processing Conditions)
Heating temperature for injection molded article: 100° C.
Pressure for stretching rod: 0.5 MPa
Primary blow pressure: 0.5 MPa
Secondary blow pressure: 2.4 MPa
Primary blow delay time: 0.32 sec
Primary blow time: 0.30 sec
Secondary blow time: 2.0 sec
Blow exhaust time: 0.6 sec
Mold temperature: 30° C.

Examples 2 to 13

Parisons and bottles were produced in the same manner as in Example 1 except that the polyamide compound (A) was changed to the polyamide compounds 2 to 9 and 11 to 14 produced in Production Examples 2 to 9 and 11 to 14.

Comparative Example 1

A parison and a bottle were produced in the same manner as in Example 1 except that the polyamide compound (A) was changed to the polyamide compound 10 produced in Production Example 10.

Comparative Example 2

A parison and a bottle were produced in the same manner as in Example 1 except that the polyamide compound (A) was changed to a mixture obtained by dry-mixing 100 parts by mass of the polyamide compound 10 and 0.21 part by mass of cobalt(II) stearate.

Comparative Example 3

A parison and a bottle were produced in the same manner as in Example 1 except that the polyamide compound (A) was changed to a mixture obtained by dry-mixing 100 parts by mass of the polyamide compound 10, 0.15 part by mass of cobalt(II) stearate and 3 parts by mass of maleic acid-modified polybutadiene (M-2000-20, a trade name, produced by Nippon Petrochemicals Co., Ltd.).

Comparative Example 4

A parison and a bottle were produced in the same manner as in Example 1 except that the polyamide compound (A) was changed to the polyamide compound 15 produced in Production Example 15.

Comparative Example 5

A parison and a bottle were produced in the same manner as in Example 1 except that the polyamide compound (A) was changed to a mixture obtained by dry-mixing 100 parts by mass of the polyamide compound 15 and 0.21 part by mass of cobalt(II) stearate.

Comparative Example 6

A parison and a bottle were produced in the same manner as in Example 1 except that the polyamide compound (A) was changed to a mixture obtained by dry-mixing 100 parts by mass of the polyamide compound 15, 0.15 part by mass of cobalt(II) stearate and 3 parts by mass of maleic acid-modified polybutadiene (M-2000-20, a trade name, produced by Nippon Petrochemicals Co., Ltd.).

Examples 14 to 26

Parisons and bottles were produced in the same manner as in Examples 1 to 13 except that the ratio of the polyamide compound (A) mixed was changed to 10% by mass.

Comparative Examples 7 to 12

Parisons and bottles were produced in the same manner as in Comparative Examples 1 to 6 except that the ratio of the polyamide compound (A) mixed was changed to 10% by mass.

Examples 27 to 33

Parisons and bottles were produced in the same manner as in Examples 1 to 4 and 11 to 13 except that the ratio of the polyamide compound (A) mixed was changed to 30% by mass.

Comparative Examples 13 to 18

Parisons and bottles were produced in the same manner as in Comparative Examples 1 to 6 except that the ratio of the polyamide compound (A) mixed was changed to 30% by mass.

Examples 34 to 40

Parisons and bottles were produced in the same manner as in Examples 1 to 4 and 11 to 13 except that the ratio of the polyamide compound (A) mixed was changed to 50% by mass.

Comparative Examples 19 to 24

Parisons and bottles were produced in the same manner as in Comparative Examples 1 to 6 except that the ratio of the polyamide compound (A) mixed was changed to 50% by mass.

[Injection Cup]

Example 41

A cup (30.5 g) was obtained by injection molding the resin composition obtained by mixing the polyamide compound (A) and the resin (B) under the following conditions. The resin (B) used was polyethylene terephthalate (BK-2180, a trade name, produced by Japan Unipet Co., Ltd.) having an intrinsic viscosity of 0.83 (measured with a mixed solvent of phenol/tetrachloroethane=6/4 (mass ratio), measurement temperature: 30° C.). The polyamide compound (A) used was the polyamide compound 1 produced in Production Example 1. The mass of the polyamide compound (A) was 10% by mass.

(Shape of Cup)

The cup had a total length of 125 mm, a bottom diameter of 52 mm, a flange outer diameter of 70 mm, a flange inner diameter of 62 mm, a thickness of 1.1 mm and an internal capacity of 320 mL. The cup was produced by using an injection molding machine (Model M200, produced by Meiki Co., Ltd., four-cavity model).

(Molding Conditions of Cup)

Injection cylinder temperature: 280° C.
Mold resin flow path temperature: 280° C.
Mold cooling water temperature: 15° C.

Examples 42 to 47

Cups were produced in the same manner as in Example 41 except that the polyamide compound (A) was changed to the polyamide compounds 2 to 4 and 11 to 13 produced in Production Examples 2 to 4 and 11 to 13.

Comparative Example 25

A cup was produced in the same manner as in Example 41 except that the polyamide compound (A) was changed to the polyamide compound 10 produced in Production Example 10.

Comparative Example 26

A cup was produced in the same manner as in Example 41 except that the polyamide compound (A) was changed to a mixture obtained by dry-mixing 100 parts by mass of the polyamide compound 10 and 0.21 part by mass of cobalt(II) stearate.

Comparative Example 27

A cup was produced in the same manner as in Example 41 except that the polyamide compound (A) was changed to a mixture obtained by dry-mixing 100 parts by mass of the polyamide compound 10, 0.15 part by mass of cobalt(II) stearate and 3 parts by mass of maleic acid-modified polybutadiene (M-2000-20, a trade name, produced by Nippon Petrochemicals Co., Ltd.).

Comparative Example 28

A cup was produced in the same manner as in Example 41 except that the polyamide compound (A) was changed to the polyamide compound 15 produced in Production Example 15.

Comparative Example 29

A cup was produced in the same manner as in Example 41 except that the polyamide compound (A) was changed to a mixture obtained by dry-mixing 100 parts by mass of the polyamide compound 15 and 0.21 part by mass of cobalt(II) stearate.

Comparative Example 30

A cup was produced in the same manner as in Example 41 except that the polyamide compound (A) was changed to a mixture obtained by dry-mixing 100 parts by mass of the polyamide compound 15, 0.15 part by mass of cobalt(II) stearate and 3 parts by mass of maleic acid-modified polybutadiene (M-2000-20, a trade name, produced by Nippon Petrochemicals Co., Ltd.).

Examples 48 to 54

Cups were produced in the same manner as in Examples 41 to 47 except that the ratio of the polyamide compound (A) mixed was changed to 30% by mass.

Comparative Examples 31 to 36

Cups were produced in the same manner as in Comparative Examples 25 to 30 except that the ratio of the polyamide compound (A) mixed was changed to 30% by mass.

Examples 55 to 61

Cups were produced in the same manner as in Examples 41 to 47 except that the ratio of the polyamide compound (A) mixed was changed to 50% by mass.

Comparative Examples 37 to 42

Cups were produced in the same manner as in Comparative Examples 25 to 30 except that the ratio of the polyamide compound (A) mixed was changed to 50% by mass.

Tables 2 and 3 show the measurement results of OTR and the evaluation results of the strength and the odor in the head space upon opening of the bottles and cups.

TABLE 2

| | Polyamide compound | | Oxygen transmission rate (mL/0.21 atm·day·package) | | | | Strength test of | Odor in head |
|---|---|---|---|---|---|---|---|---|
| | No. | Mass (%) | 1 day | 7 days | 15 days | 30 days | bottle | space |
| Example 1 | 1 | 5 | 0.0022 | 0.0051 | 0.0082 | 0.0142 | A | A |
| Example 2 | 2 | 5 | 0.0015 | 0.0042 | 0.0057 | 0.0135 | A | A |
| Example 3 | 3 | 5 | 0.0008 | 0.0021 | 0.0039 | 0.0137 | A | A |
| Example 4 | 4 | 5 | 0.0002 | 0.0018 | 0.0041 | 0.0123 | A | A |
| Example 5 | 5 | 5 | 0.0012 | 0.0041 | 0.0071 | 0.0133 | A | A |
| Example 6 | 6 | 5 | 0.0013 | 0.0037 | 0.0062 | 0.0133 | A | A |
| Example 7 | 7 | 5 | 0.0011 | 0.0039 | 0.0059 | 0.0142 | A | A |
| Example 8 | 8 | 5 | 0.0010 | 0.0034 | 0.0061 | 0.0132 | A | A |
| Example 9 | 9 | 5 | 0.0011 | 0.0041 | 0.0071 | 0.0134 | A | A |
| Example 10 | 11 | 5 | 0.0018 | 0.0042 | 0.0093 | 0.0141 | A | A |
| Example 11 | 12 | 5 | 0.0012 | 0.0043 | 0.0052 | 0.0135 | A | A |
| Example 12 | 13 | 5 | 0.0007 | 0.0021 | 0.0041 | 0.0121 | A | A |
| Example 13 | 14 | 5 | 0.0003 | 0.0038 | 0.0063 | 0.0132 | A | A |
| Comparative | 10 | 5 | 0.0202 | 0.0201 | 0.0199 | 0.0198 | A | A |

TABLE 2-continued

|  | Polyamide compound | | Oxygen transmission rate (mL/0.21 atm·day·package) | | | | Strength test of | Odor in head |
|---|---|---|---|---|---|---|---|---|
|  | No. | Mass (%) | 1 day | 7 days | 15 days | 30 days | bottle | space |
| Example 1 Comparative Example 2 | 10 *1) | 5 | 0.0001 | 0.0001 | 0.0001 | 0.0001 | B | A |
| Comparative Example 3 | 10 *2) | 5 | 0.0001 | 0.0001 | 0.0001 | 0.0001 | A | B |
| Comparative Example 4 | 15 | 5 | 0.0201 | 0.0199 | 0.0198 | 0.0198 | A | A |
| Comparative Example 5 | 15 *1) | 5 | 0.0001 | 0.0001 | 0.0001 | 0.0001 | B | A |
| Comparative Example 6 | 15 *2) | 5 | 0.0001 | 0.0001 | 0.0001 | 0.0001 | A | B |
| Example 14 | 1 | 10 | 0.0008 | 0.0031 | 0.0041 | 0.0082 | A | A |
| Example 15 | 2 | 10 | 0.0007 | 0.0022 | 0.0037 | 0.0071 | A | A |
| Example 16 | 3 | 10 | 0.0005 | 0.0013 | 0.0028 | 0.0063 | A | A |
| Example 17 | 4 | 10 | 0.0003 | 0.0011 | 0.0022 | 0.0051 | A | A |
| Example 18 | 5 | 10 | 0.0010 | 0.0021 | 0.0034 | 0.0073 | A | A |
| Example 19 | 6 | 10 | 0.0009 | 0.0022 | 0.0041 | 0.0083 | A | A |
| Example 20 | 7 | 10 | 0.0008 | 0.0021 | 0.0038 | 0.0072 | A | A |
| Example 21 | 8 | 10 | 0.0008 | 0.0021 | 0.0039 | 0.0084 | A | A |
| Example 22 | 9 | 10 | 0.0009 | 0.0022 | 0.0036 | 0.0083 | A | A |
| Example 23 | 11 | 10 | 0.0012 | 0.0032 | 0.0047 | 0.0081 | A | A |
| Example 24 | 12 | 10 | 0.0007 | 0.0024 | 0.0032 | 0.0073 | A | A |
| Example 25 | 13 | 10 | 0.0080 | 0.0011 | 0.0023 | 0.0053 | A | A |
| Example 26 | 14 | 10 | 0.0090 | 0.0025 | 0.0038 | 0.0082 | A | A |
| Comparative Example 7 | 10 | 10 | 0.0131 | 0.0129 | 0.0128 | 0.0127 | A | A |
| Comparative Example 8 | 10 *1) | 10 | 0.0001 | 0.0001 | 0.0001 | 0.0001 | B | A |
| Comparative Example 9 | 10 *2) | 10 | 0.0001 | 0.0001 | 0.0001 | 0.0001 | A | B |
| Comparative Example 10 | 15 | 10 | 0.0126 | 0.0125 | 0.0124 | 0.0124 | A | A |
| Comparative Example 11 | 15 *1) | 10 | 0.0001 | 0.0001 | 0.0001 | 0.0001 | B | A |
| Comparative Example 12 | 15 *2) | 10 | 0.0001 | 0.0001 | 0.0001 | 0.0001 | A | B |
| Example 27 | 1 | 30 | 0.0003 | 0.0011 | 0.0022 | 0.0031 | A | A |
| Example 28 | 2 | 30 | 0.0001 | 0.0009 | 0.0017 | 0.0026 | A | A |
| Example 29 | 3 | 30 | 0.0001 | 0.0007 | 0.0015 | 0.0022 | A | A |
| Example 30 | 4 | 30 | 0.0001 | 0.0003 | 0.0013 | 0.0020 | A | A |
| Example 31 | 11 | 30 | 0.0003 | 0.0012 | 0.0023 | 0.0032 | A | A |
| Example 32 | 12 | 30 | 0.0001 | 0.0001 | 0.0019 | 0.0027 | A | A |
| Example 33 | 13 | 30 | 0.0001 | 0.0010 | 0.0013 | 0.0019 | A | A |
| Comparative Example 13 | 10 | 30 | 0.0062 | 0.0058 | 0.0057 | 0.0056 | A | A |
| Comparative Example 14 | 10 *1) | 30 | 0.0001 | 0.0001 | 0.0001 | 0.0001 | B | A |
| Comparative Example 15 | 10 *2) | 30 | 0.0001 | 0.0001 | 0.0001 | 0.0001 | A | B |
| Comparative Example 16 | 15 | 30 | 0.0059 | 0.0057 | 0.0056 | 0.0056 | A | A |
| Comparative Example 17 | 15 *1) | 30 | 0.0001 | 0.0001 | 0.0001 | 0.0001 | B | A |
| Comparative Example 18 | 15 *2) | 30 | 0.0001 | 0.0001 | 0.0001 | 0.0001 | A | B |
| Example 34 | 1 | 50 | 0.0001 | 0.0001 | 0.0008 | 0.0018 | A | A |
| Example 35 | 2 | 50 | 0.0001 | 0.0001 | 0.0005 | 0.0011 | A | A |
| Example 36 | 3 | 50 | 0.0001 | 0.0001 | 0.0003 | 0.0080 | A | A |
| Example 37 | 4 | 50 | 0.0001 | 0.0001 | 0.0002 | 0.0007 | A | A |
| Example 38 | 11 | 50 | 0.0001 | 0.0001 | 0.0007 | 0.0017 | A | A |
| Example 39 | 12 | 50 | 0.0001 | 0.0001 | 0.0050 | 0.0012 | A | A |
| Example 40 | 13 | 50 | 0.0001 | 0.0001 | 0.0001 | 0.0008 | A | A |
| Comparative Example 19 | 10 | 50 | 0.0034 | 0.0034 | 0.0033 | 0.0032 | A | A |
| Comparative Example 20 | 10 *1) | 50 | 0.0001 | 0.0001 | 0.0001 | 0.0001 | B | A |
| Comparative Example 21 | 10 *2) | 50 | 0.0001 | 0.0001 | 0.0001 | 0.0001 | A | B |
| Comparative Example 22 | 15 | 50 | 0.0035 | 0.0033 | 0.0033 | 0.0033 | A | A |

TABLE 2-continued

| | Polyamide compound | | Oxygen transmission rate (mL/0.21 atm·day·package) | | | | Strength test of bottle | Odor in head space |
|---|---|---|---|---|---|---|---|---|
| | No. | Mass (%) | 1 day | 7 days | 15 days | 30 days | | |
| Comparative Example 23 | 15 *1) | 50 | 0.0001 | 0.0001 | 0.0001 | 0.0001 | B | A |
| Comparative Example 24 | 15 *2) | 50 | 0.0001 | 0.0001 | 0.0001 | 0.0001 | A | B |

*1) cobalt(II) stearate added to polyamide compound

*2) cobalt(II) stearate and maleic acid-modified polybutadiene added to polyamide compound

TABLE 3

| | Polyamide compound | | Oxygen transmission rate (mL/0.21 atm·day·package) | | | | Strength test of cup | Odor in head space |
|---|---|---|---|---|---|---|---|---|
| | No. | Mass (%) | 1 day | 7 days | 15 days | 30 days | | |
| Example 41 | 1 | 10 | 0.0016 | 0.0042 | 0.0065 | 0.0086 | A | A |
| Example 42 | 2 | 10 | 0.0013 | 0.0037 | 0.0048 | 0.0067 | A | A |
| Example 43 | 3 | 10 | 0.0009 | 0.0026 | 0.0041 | 0.0058 | A | A |
| Example 44 | 4 | 10 | 0.0007 | 0.0018 | 0.0036 | 0.0047 | A | A |
| Example 45 | 11 | 10 | 0.0014 | 0.0043 | 0.0064 | 0.0087 | A | A |
| Example 46 | 12 | 10 | 0.0011 | 0.0038 | 0.0046 | 0.0064 | A | A |
| Example 47 | 13 | 10 | 0.0006 | 0.0017 | 0.0039 | 0.0046 | A | A |
| Comparative Example 25 | 10 | 10 | 0.0119 | 0.0118 | 0.0118 | 0.0117 | A | A |
| Comparative Example 26 | 10 *1) | 10 | 0.0001 | 0.0001 | 0.0001 | 0.0001 | B | A |
| Comparative Example 27 | 10 *2) | 10 | 0.0001 | 0.0001 | 0.0001 | 0.0001 | A | B |
| Comparative Example 28 | 15 | 10 | 0.0119 | 0.0118 | 0.0117 | 0.0117 | A | A |
| Comparative Example 29 | 15 *1) | 10 | 0.0001 | 0.0001 | 0.0001 | 0.0001 | B | A |
| Comparative Example 30 | 15 *2) | 10 | 0.0001 | 0.0001 | 0.0001 | 0.0001 | A | B |
| Example 48 | 1 | 30 | 0.0007 | 0.0016 | 0.0027 | 0.0037 | A | A |
| Example 49 | 2 | 30 | 0.0005 | 0.0014 | 0.0021 | 0.0028 | A | A |
| Example 50 | 3 | 30 | 0.0003 | 0.0011 | 0.0018 | 0.0028 | A | A |
| Example 51 | 4 | 30 | 0.0001 | 0.0006 | 0.0016 | 0.0021 | A | A |
| Example 52 | 11 | 30 | 0.0006 | 0.0015 | 0.0028 | 0.0039 | A | A |
| Example 53 | 12 | 30 | 0.0006 | 0.0013 | 0.0021 | 0.0027 | A | A |
| Example 54 | 13 | 30 | 0.0001 | 0.0006 | 0.0017 | 0.0027 | A | A |
| Comparative Example 31 | 10 | 30 | 0.0071 | 0.0070 | 0.0070 | 0.0070 | A | A |
| Comparative Example 32 | 10 *1) | 30 | 0.0001 | 0.0001 | 0.0001 | 0.0001 | B | A |
| Comparative Example 33 | 10 *2) | 30 | 0.0001 | 0.0001 | 0.0001 | 0.0001 | A | B |
| Comparative Example 34 | 15 | 30 | 0.0073 | 0.0072 | 0.0071 | 0.0071 | A | A |
| Comparative Example 35 | 15 *1) | 30 | 0.0001 | 0.0001 | 0.0001 | 0.0001 | B | A |
| Comparative Example 36 | 15 *2) | 30 | 0.0001 | 0.0001 | 0.0001 | 0.0001 | A | B |
| Example 55 | 1 | 50 | 0.0003 | 0.0006 | 0.0011 | 0.0018 | A | A |
| Example 56 | 2 | 50 | 0.0001 | 0.0003 | 0.0008 | 0.0016 | A | A |
| Example 57 | 3 | 50 | 0.0001 | 0.0002 | 0.0005 | 0.0013 | A | A |
| Example 58 | 4 | 50 | 0.0001 | 0.0001 | 0.0003 | 0.0009 | A | A |
| Example 59 | 11 | 50 | 0.0003 | 0.0007 | 0.0012 | 0.0018 | A | A |
| Example 60 | 12 | 50 | 0.0001 | 0.0002 | 0.0007 | 0.0015 | A | A |
| Example 61 | 13 | 50 | 0.0001 | 0.0001 | 0.0003 | 0.0010 | A | A |
| Comparative Example 37 | 10 | 50 | 0.0035 | 0.0034 | 0.0034 | 0.0034 | A | A |
| Comparative Example 38 | 10 *1) | 50 | 0.0001 | 0.0001 | 0.0001 | 0.0001 | B | A |
| Comparative Example 39 | 10 *2) | 50 | 0.0001 | 0.0001 | 0.0001 | 0.0001 | A | B |
| Comparative Example 40 | 15 | 50 | 0.0034 | 0.0034 | 0.0034 | 0.0034 | A | A |

TABLE 3-continued

| | Polyamide compound | | Oxygen transmission rate (mL/0.21 atm·day·package) | | | | Strength test of cup | Odor in head space |
|---|---|---|---|---|---|---|---|---|
| | No. | Mass (%) | 1 day | 7 days | 15 days | 30 days | | |
| Comparative Example 41 | 15 *1) | 50 | 0.0001 | 0.0001 | 0.0001 | 0.0001 | B | A |
| Comparative Example 42 | 15 *2) | 50 | 0.0001 | 0.0001 | 0.0001 | 0.0001 | A | B |

*1) cobalt(II) stearate added to polyamide compound
*2) cobalt(II) stearate and maleic acid-modified polybutadiene added to polyamide compound The bottles and cups of Examples 1 to 61 are all excellent in oxygen barrier property, and suffer considerably small decrease of the strength due to oxygen absorption with the lapse of time.

In the comparative examples where cobalt stearate or maleic acid-modified polybutadiene is used for improving the oxygen transmission rate, on the other hand, although the oxygen barrier property is excellent, the strength of the bottle or cup is lowered due to oxidative decomposition of the resin by the cobalt catalyst with the lapse of time. In the comparative examples using maleic acid-modified polybutadiene, in particular, offensive odor occurs upon opening due to the generation of low molecular weight compounds through oxidative degradation of the polybutadiene.

INDUSTRIAL APPLICABILITY

The injection molded article and the container obtained by processing the same of the present invention may be favorably used as a packaging material.

The invention claimed is:

1. An injection molded article, comprising a resin composition comprising a polyamide compound and a resin, wherein the polyamide compound comprises:
   from 25 to 50% by mol of a diamine unit comprising at least one diamine unit selected from the group consisting of an aromatic diamine unit of formula (I-1), and an alicyclic diamine unit of formula (I-2), in an amount in total of 50% by mol or more;
   from 25 to 50% by mol of a dicarboxylic acid unit comprising a linear aliphatic dicarboxylic acid unit of formula (II-1), an aromatic dicarboxylic acid unit of formula (II-2), or both in an amount in total of 50% by mol or more; and
   from 0.1 to 50% by mol of a constitutional unit of formula (III):

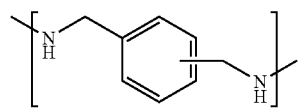  (I-1)

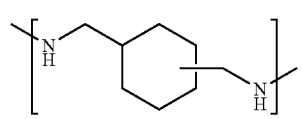  (I-2)

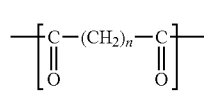  (II-1)

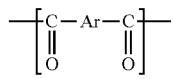  (II-2)

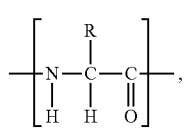  (III)

and wherein:
   n is an integer of from 2 to 18;
   Ar is an arylene group; and
   R is a substituted or unsubstituted alkyl group or a substituted or unsubstituted aryl group.

2. The injection molded article according to claim 1, wherein R is a substituted or unsubstituted alkyl group having from 1 to 6 carbon atoms or a substituted or unsubstituted aryl group having from 6 to 10 carbon atoms.

3. The injection molded article according to claim 1, wherein the diamine unit comprises an m-xylylenediamine unit in an amount of 50% by mol or more.

4. The injection molded article according to claim 1, wherein the polyamide compound comprises a linear aliphatic dicarboxylic acid unit comprising at least one selected from the group consisting of an adipic acid unit, a sebacic acid unit, and a 1,12-dodecanedicarboxylic acid unit, in an amount in total of 50% by mol or more.

5. The injection molded article according to claim 1, wherein the polyamide compound comprises an aromatic dicarboxylic acid unit comprising at least one selected from the group consisting of an isophthalic acid unit, a terephthalic acid unit, and a 2,6-naphthalene dicarboxylic acid unit, in an amount in total of 50% by mol or more.

6. The injection molded article according to claim 1, wherein the polyamide compound further comprises a ω-aminocarboxylic acid unit of formula (X) in an amount of from 0.1 to 49.9% by mol based on total constitutional units of the polyamide compound:

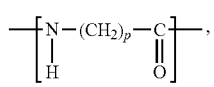  (X)

wherein p is an integer of from 2 to 18.

7. The injection molded article according to claim 6, wherein the ω-aminocarboxylic acid unit comprises a 6-aminohexanoic acid unit, a 12-amino dodecanoic acid unit, or both in an amount in total of 50% by mol or more.

8. The injection molded article according to claim 1, wherein the resin is at least one selected from the group consisting of a polyolefin, a polyester, a polyamide, an ethylene-vinyl alcohol copolymer, and a plant-derived resin.

9. The injection molded article according to claim 1, wherein
the polyamide compound has a relative viscosity of 1.8 or more and 4.2 or less, and
a mass ratio of the polyamide compound/the resin is from 5/95 to 95/5.

10. The injection molded article according claim 1, wherein
the polyamide compound has a relative viscosity of 1.01 or more and less than 1.8, and
a mass ratio of the polyamide compound/the resin is from 5/95 to 50/50.

11. A container obtained by processing the injection molded article according to claim 1.

12. The container according to claim 11, obtained by stretching blow molding.

13. The injection molded article according to claim 1, wherein the polyamide compound is a crystalline polyamide compound.

* * * * *